(12) United States Patent
Endo

(10) Patent No.: US 6,801,896 B1
(45) Date of Patent: Oct. 5, 2004

(54) VOICE-BASED SEARCH AND SELECTION OF SPEECH RECOGNITION DATA

(75) Inventor: Koji Endo, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 707 days.

(21) Appl. No.: 09/608,069

(22) Filed: Jun. 30, 2000

(30) Foreign Application Priority Data

Jun. 30, 1999 (JP) .......................................... 11-185311

(51) Int. Cl.[7] .............................................. G10L 21/00
(52) U.S. Cl. ..................................... 704/270; 704/251
(58) Field of Search ................................. 704/231, 233, 704/235, 270, 251–257

(56) References Cited

U.S. PATENT DOCUMENTS 5,257,314 A * 10/1993 Kimura ...................... 704/251
5,267,323 A   11/1993 Kimura
6,507,815 B1 *  1/2003 Yamamoto .................. 704/231

* cited by examiner

Primary Examiner—David D. Knepper
(74) Attorney, Agent, or Firm—ArentFox

(57) ABSTRACT

The voice-based manipulation apparatus includes a storage section for storing voice information for specifying manipulation targets. A manipulation section manipulates the manipulation target that is associated with the voice information stored in the storage section. A search section searches the voice information stored in the storage section in association with the manipulation target and presents resultant voice information. The voice-based manipulation method includes storing voice information for specifying manipulation targets in a storage section; manipulating the manipulation target which is associated with the voice information stored in the storage section; and searching the voice information stored in the storage section in association with the manipulation target.

20 Claims, 20 Drawing Sheets

FIG.3 A

| REGISTRATION TARGET | | REGISTERED VOICE DATA |
|---|---|---|
| disc1 | track1 | wʌn |
| disc1 | track5 | tu : |
| disc7 | track1 | θri : |
| disc7 | track2 | fɔ : r |
| band fm1 | 76.1MHz | faiv |
| band fm1 | 78.9MHz | siks |
| band fm2 | 76.1MHz | sevn |
| band fm2 | 81.1MHz | eit |
| tv | 1 CHANNEL | nain |
| tv | 4 CHANNELS | ten |

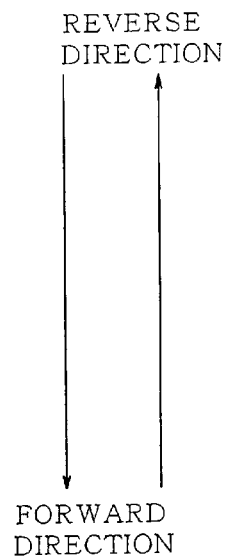

REVERSE DIRECTION

FORWARD DIRECTION

FIG.3 B

| REGISTRATION TARGET | REGISTERED VOICE DATA |
|---|---|
| cd | si : di : |
| tuner | t(j)u : nɚ |
| tape | teip |
| md | emdi : |
| multi-md | mʌlti emdi : |
| multi-cd | mʌlti si : di : |

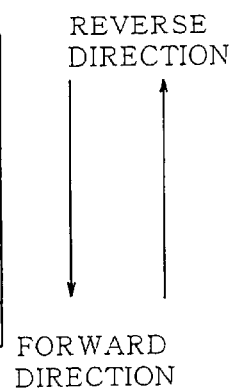

REVERSE DIRECTION

FORWARD DIRECTION

FIG.3 C

| REGISTRATION TARGET | REGISTERED VOICE DATA |
|---|---|
| eq SUPER BASS | s(j)a : pɚbæs |
| eq NATURAL | nætʃrl |
| eq VOCAL | voukl |
| eq FLAT | flæt |
| eq FRONT RIGHT | rait |
| eq FRONT | frʌnt |
| eq POSITION OFF | ɔ( : )f |

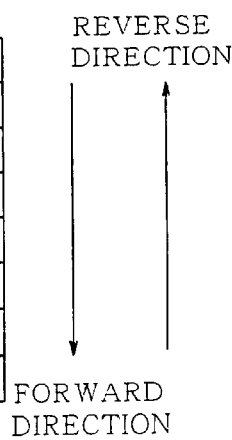

REVERSE DIRECTION

FORWARD DIRECTION

FIG. 4A

| NORMAL REGISTRATION/VOICE OPERATION KEY (6) | |
|---|---|
| FUNCTION | (WHEN USER CONTINUOUSLY DEPRESSES THE KEY FOR 2 OR MORE SEC DURING STANDBY PROCESS) <br><br> (1) SET VOICE REGISTRATION MODE. <br><br> (2) REGISTER VOICE UTTERED BY USER IN TITLE DESIGNATION VOICE DATA MEMORY TABLE 19a IN ASSOCIATION WITH AUDIO UNIT IN OPERATION. NOTE THAT REGISTRATION SHOULD TAKE FOR ONLY 2.5 SEC. |

FIG. 4B

| NORMAL REGISTRATION/VOICE OPERATION KEY (6) | |
|---|---|
| FUNCTION | (WHEN USER DEPRESSES THE KEY FOR SHORT TIME DURING STANDBY PROCESS) <br><br> (1) SET VOICE-BASED MANIPULATION MODE. <br><br> (2) WHEN USER UTTERS VOICE CORRESPONDING TO REGISTERED VOICE DATA IN TITLE DESIGNATION VOICE DATA MEMORY TABLE 19a, CONTROL AUDIO UNIT ASSOCIATED WITH THAT VOICE. |

FIG.5A

| UNIT REGISTRATION/SEARCH KEY (9) | |
|---|---|
| FUNCTION | (WHEN USER CONTINUOUSLY DEPRESSES THE KEY FOR 2 OR MORE SEC DURING STANDBY PROCESS)<br><br>(1) SET UNIT DESIGNATION VOICE REGISTRATION MODE.<br><br>(2) REGISTER VOICE UTTERED BY USER IN UNIT DESIGNATION VOICE DATA MEMORY TABLE 19b IN ASSOCIATION WITH AUDIO UNIT IN OPERATION. NOTE THAT REGISTRATION SHOULD TAKE FOR ONLY 2.5 SEC. |

FIG. 6A

| | ADJUSTED VOICE REGISTRATION/SEARCH KEY (10) |
|---|---|
| FUNCTION | (WHEN USER CONTINUOUSLY DEPRESSES THE KEY FOR 2 OR MORE SEC DURING STANDBY PROCESS)<br><br>(1) SET EQUALIZER ADJUSTED VOICE REGISTRATION MODE.<br><br>(2) REGISTER VOICE FOR EQUALIZER ADJUSTMENT, UTTERED BY USER, IN ADJUSTED VOICE DATA MEMORY TABLE 19c IN ASSOCIATION WITH ADJUSTMENT STATE OF EQUALIZER. NOTE THAT REGISTRATION SHOULD TAKE FOR ONLY 2.5 SEC.<br><br>(WHEN USER DEPRESSES THE KEY FOR SHORT TIME AFTER CONTINUOUS DEPRESSION FOR 2 OR MORE SEC)<br><br>(1) SET POSITION ADJUSTED VOICE REGISTRATION MODE<br><br>(2) REGISTER VOICE FOR POSITION ADJUSTMENT, UTTERED BY USER, IN ADJUSTED VOICE DATA MEMORY TABLE 19c IN ASSOCIATION WITH ADJUSTMENT STATE OF POSITION. NOTE THAT REGISTRATION SHOULD TAKE FOR ONLY 2.5 SEC. |

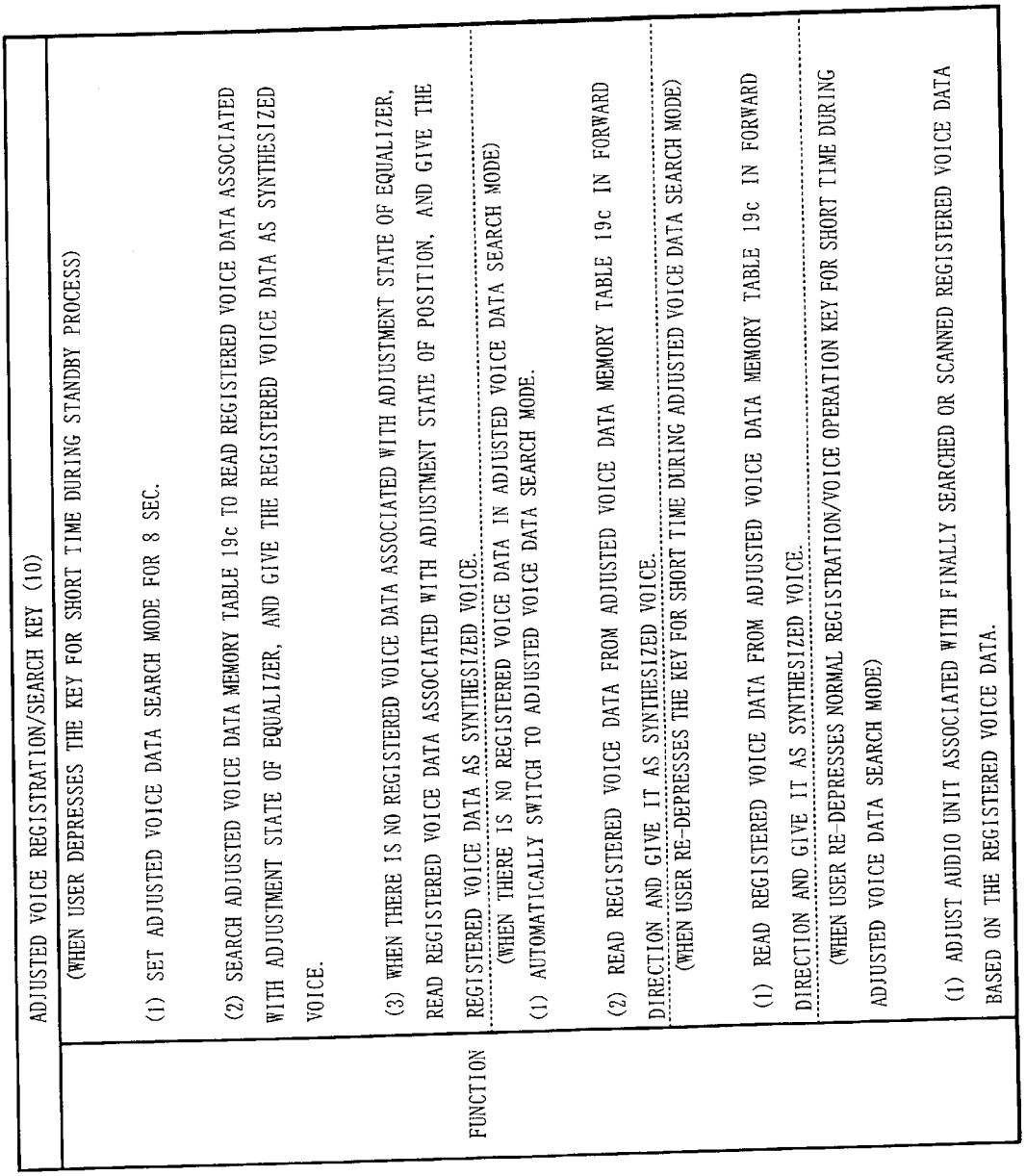

FIG. 6 B

| | |
|---|---|
| ADJUSTED VOICE REGISTRATION/SEARCH KEY (10) | (WHEN USER DEPRESSES THE KEY FOR SHORT TIME DURING STANDBY PROCESS)<br>(1) SET ADJUSTED VOICE DATA SEARCH MODE FOR 8 SEC.<br>(2) SEARCH ADJUSTED VOICE DATA MEMORY TABLE 19c TO READ REGISTERED VOICE DATA ASSOCIATED WITH ADJUSTMENT STATE OF EQUALIZER, AND GIVE THE REGISTERED VOICE DATA AS SYNTHESIZED VOICE.<br>(3) WHEN THERE IS NO REGISTERED VOICE DATA ASSOCIATED WITH ADJUSTMENT STATE OF EQUALIZER, READ REGISTERED VOICE DATA ASSOCIATED WITH ADJUSTMENT STATE OF POSITION, AND GIVE THE REGISTERED VOICE DATA AS SYNTHESIZED VOICE.<br>(WHEN THERE IS NO REGISTERED VOICE DATA IN ADJUSTED VOICE DATA SEARCH MODE)<br>(1) AUTOMATICALLY SWITCH TO ADJUSTED VOICE DATA SEARCH MODE.<br>(2) READ REGISTERED VOICE DATA FROM ADJUSTED VOICE DATA MEMORY TABLE 19c IN FORWARD DIRECTION AND GIVE IT AS SYNTHESIZED VOICE.<br>(WHEN USER RE-DEPRESSES THE KEY FOR SHORT TIME DURING ADJUSTED VOICE DATA SEARCH MODE)<br>(1) READ REGISTERED VOICE DATA FROM ADJUSTED VOICE DATA MEMORY TABLE 19c IN FORWARD DIRECTION AND GIVE IT AS SYNTHESIZED VOICE.<br>(WHEN USER RE-DEPRESSES NORMAL REGISTRATION/VOICE OPERATION KEY FOR SHORT TIME DURING ADJUSTED VOICE DATA SEARCH MODE)<br>(1) ADJUST AUDIO UNIT ASSOCIATED WITH FINALLY SEARCHED OR SCANNED REGISTERED VOICE DATA BASED ON THE REGISTERED VOICE DATA. |
| FUNCTION | |

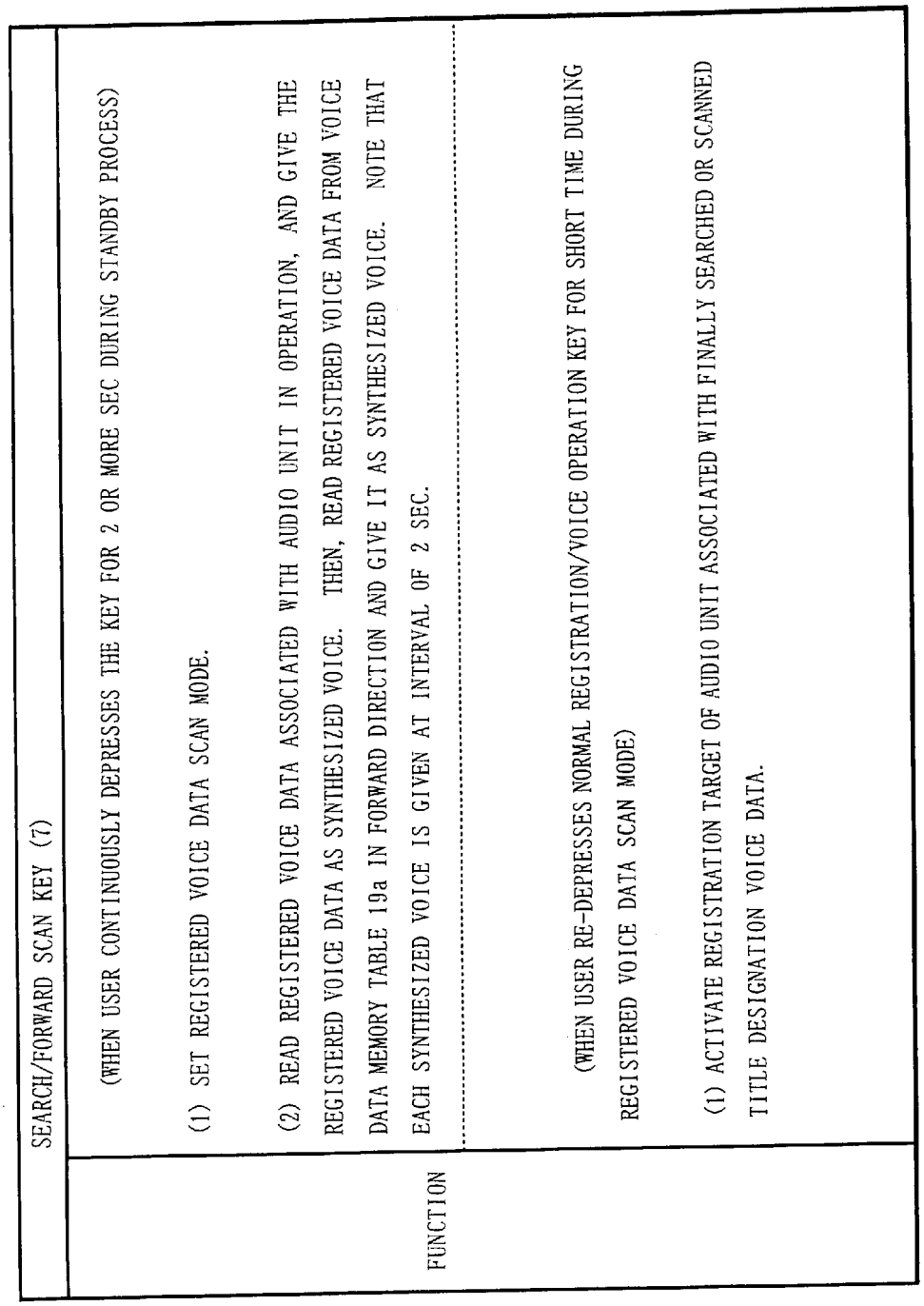

FIG.8 B

| SEARCH/FORWARD SCAN KEY (7) | |
|---|---|
| FUNCTION | (WHEN USER CONTINUOUSLY DEPRESSES THE KEY FOR 2 OR MORE SEC DURING STANDBY PROCESS)<br><br>(1) SET REGISTERED VOICE DATA SCAN MODE.<br><br>(2) READ REGISTERED VOICE DATA ASSOCIATED WITH AUDIO UNIT IN OPERATION, AND GIVE THE REGISTERED VOICE DATA AS SYNTHESIZED VOICE. THEN, READ REGISTERED VOICE DATA FROM VOICE DATA MEMORY TABLE 19a IN FORWARD DIRECTION AND GIVE IT AS SYNTHESIZED VOICE. NOTE THAT EACH SYNTHESIZED VOICE IS GIVEN AT INTERVAL OF 2 SEC.<br><br>(WHEN USER RE-DEPRESSES NORMAL REGISTRATION/VOICE OPERATION KEY FOR SHORT TIME DURING REGISTERED VOICE DATA SCAN MODE)<br><br>(1) ACTIVATE REGISTRATION TARGET OF AUDIO UNIT ASSOCIATED WITH FINALLY SEARCHED OR SCANNED TITLE DESIGNATION VOICE DATA. |

FIG. 9B

| | SEARCH/REVERSE SCAN KEY (8) |
|---|---|
| FUNCTION | (WHEN USER CONTINUOUSLY DEPRESSES THE KEY FOR 2 OR MORE SEC DURING STANDBY PROCESS)<br><br>(1) SET REGISTERED VOICE DATA SCAN MODE.<br><br>(2) READ REGISTERED VOICE DATA ASSOCIATED WITH AUDIO UNIT IN OPERATION, AND GIVE THE REGISTERED VOICE DATA AS SYNTHESIZED VOICE. THEN, READ REGISTERED VOICE DATA FROM VOICE DATA MEMORY TABLE 19a IN REVERSE DIRECTION AND GIVE IT AS SYNTHESIZED VOICE. NOTE THAT EACH SYNTHESIZED VOICE IS GIVEN AT INTERVAL OF 2 SEC.<br><br>(WHEN USER RE-DEPRESSES NORMAL REGISTRATION/VOICE OPERATION KEY FOR SHORT TIME DURING REGISTERED VOICE DATA SCAN MODE)<br><br>(1) ACTIVATE REGISTRATION TARGET OF AUDIO UNIT ASSOCIATED WITH FINALLY SEARCHED OR SCANNED TITLE DESIGNATION VOICE DATA. |

VOICE-BASED SEARCH AND SELECTION OF SPEECH RECOGNITION DATA

BACKGROUND OF THE INVENTION

1. Field of the Invention

The present invention relates to a voice-based manipulation technique capable of controlling and manipulating electronic devices or the like through input voices, and, more particularly, to a voice-based manipulation method and apparatus, which allow even a user who does not remember registered words to easily check the correlation between registered words and subjects to be manipulated, thereby improving the operability.

2. Description of the Related Art

Voice-based manipulation techniques which permit a user to manipulate electronic devices or the like through input voices have been proposed. Meanwhile, some improvements on speech recognition techniques have also been made. With such improved speech recognition techniques, there are active developments of electronic devices or the like which use voice-based manipulation techniques.

For example, there is known an on-board audio system for a vehicle, which can be manipulated with voices in the following manner. Using this audio system, a user registers voice data for each of the channel frequencies of broadcasting stations. When the user utters some words corresponding to one of the registered voice data, the audio system recognizes the uttered words through a speech recognition technique and automatically tunes itself to the designated channel frequency.

More specifically, the user tunes in to the channel frequency of a desired broadcasting station and utters words, for example, "first broadcasting station", by manipulating a voice registration button provided on the on-board audio system, and then voice data of the words "first broadcasting station" can be stored (registered) in a memory in association with that channel frequency. In a similar fashion, the user tunes the audio system to the channel frequencies of other broadcasting stations and utters words, such as "second broadcasting station" and "third broadcasting station". As a result, voice data of the words "second broadcasting station", "third broadcasting station" and so forth can be stored in the memory in association with the tuned channel frequencies. When, after this voice registering operation, the user utters one stream of words, selected from the registered groups of words, such as "first broadcasting station", "second broadcasting station" and "third broadcasting station", the audio system recognizes the voiced words and automatically tunes itself to the designated channel frequency.

As mentioned above, this on-board audio system can permits voice-based manipulation to be performed based on voice data that has been registered beforehand in association with subjects to be manipulated (hereinafter referred to as "manipulation targets"). But, users are likely to forget registered words or forget the correlation between the registered words and manipulation targets. In this case, each user may have to, for example, repeat the above-described voice registering operation to change old voice data stored in the memory to new voice data.

It is desirable to ensure voice registration of any words, not specific words, thereby improving the operability for users. If such a highly general-purpose design is taken, the designed audio system, though effective in many ways, would suffer a lower operability, because users are apt to forget registered words.

While the tuning operation of an on-board audio system has been specifically discussed to show the problem of the conventional voice-based manipulation techniques, the same problem arises in the case where a user who is likely to forget registered words loads a recording/reproducing medium in an MD (Mini Disc) player, CD (Compact Disc) player or the like, which is installed in an on-board audio system and selects a musical piece, a title or the like, recorded on that medium, with voices.

The factor that users may forget registered words is the problem that should be overcome not only for on-board audio systems for vehicles but also the voice-based manipulation techniques.

SUMMARY OF THE INVENTION

Accordingly, it is an object of the present invention to provide a voice-based manipulation method and apparatus, which allow even a user who has forgotten registered words to easily check the correlation between registered words and manipulation targets, thereby ensuring an improved operability.

To achieve the above object, according to one aspect of this invention, there is provided a voice-based manipulation apparatus which comprises a storage section for storing voice information for specifying manipulation targets in association with the manipulation targets; a manipulation section for, when a voice is supplied, manipulating the manipulation targets which is associated with the voice information stored in the storage section which corresponds to the voice; and a search section for searching the voice information stored in the storage section in association with the manipulation target and presenting the resultant voice information.

According to another aspect of this invention, there is provided a voice-based manipulation method which comprises the steps of storing voice information for specifying manipulation targets in a storage section in association with the manipulation targets; manipulating, when a voice is supplied, the manipulation targets which corresponds to the voice; and searching the voice information stored in the storage section in association with the manipulation target and presenting resultant voice information.

With the above structures, a user can acquire voice information which is searched and presented by the search section (or the searching step). Even if the user forgets, or is uncertain abut, voice information stored (registered) in the storage section, the user can easily check the correlation between the voice information and the manipulation target which is associated with that voice information. Even when the user does not remember voice information, therefore, it is unnecessary to store voice information again in the storage section, resulting in an improved operability.

It is preferable in the above voice-based manipulation apparatus and method that, in response a search instruction externally supplied, the search section or the searching step should detect an active manipulation target, search for that voice information which is associated with the detected active manipulation target and present the searched voice information.

In this case, when voice information associated with the active manipulation target is not stored in the storage section, the search section or the searching steps may search other voice information stored in the storage section in association with the manipulation target and present the searched voice information.

In the above two preferable modes, it is further preferable that in response to the search instruction externally supplied, the search section or the searching step should search the voice information stored in the storage section in a predetermined order in association with the manipulation target and present the searched voice information.

In this case, the predetermined order may be an alphabetical order, a forward sort direction or a reverse sort direction.

In the voice-based manipulation apparatus according to the first aspect, the voice-based manipulation method according to the second aspect, or any one of the above-described preferable modes, the storage section can store the voice information again and may store a supplied voice as voice information associated with an active manipulation target at the time of storing the voice information again.

BRIEF DESCRIPTION OF THE DRAWINGS

These and other objects and advantages of the invention will become readily apparent from the following description, taken in conjunction with the accompanying drawings, wherein:

FIGS. 3A through 3C are diagrams respectively showing individual memory maps of a title designation voice data memory table, a unit designation voice data memory table and an equalizer-adjustment voice data memory table;

FIGS. 4A and 4B are explanatory diagrams illustrating the functions of a normal registration/voice-based operation key;

FIGS. 6A and 6B are explanatory diagrams illustrating the functions of an equalizer-adjustment voice registration/search key;

FIGS. 8A and 8B are explanatory diagrams illustrating the functions of a search/forward scan key;

DETAILED DESCRIPTION OF THE PREFERRED EMBODIMENT

With reference to the accompanying drawings, a description will now be given of a preferred embodiment of the present invention as adapted to a voice-based manipulation apparatus that allows a user to perform the voice-based manipulation of an on-board audio system for a vehicle which is equipped with a reception tuner for receiving radio broadcast waves or the like, an MD player for playing an MD, a CD player for playing a CD, an equalizer for adjusting a frequency characteristic, an amplifier for controlling the volume and so forth. (Those components of the on-board audio system will hereinafter be called "audio units".)

Figure 1:
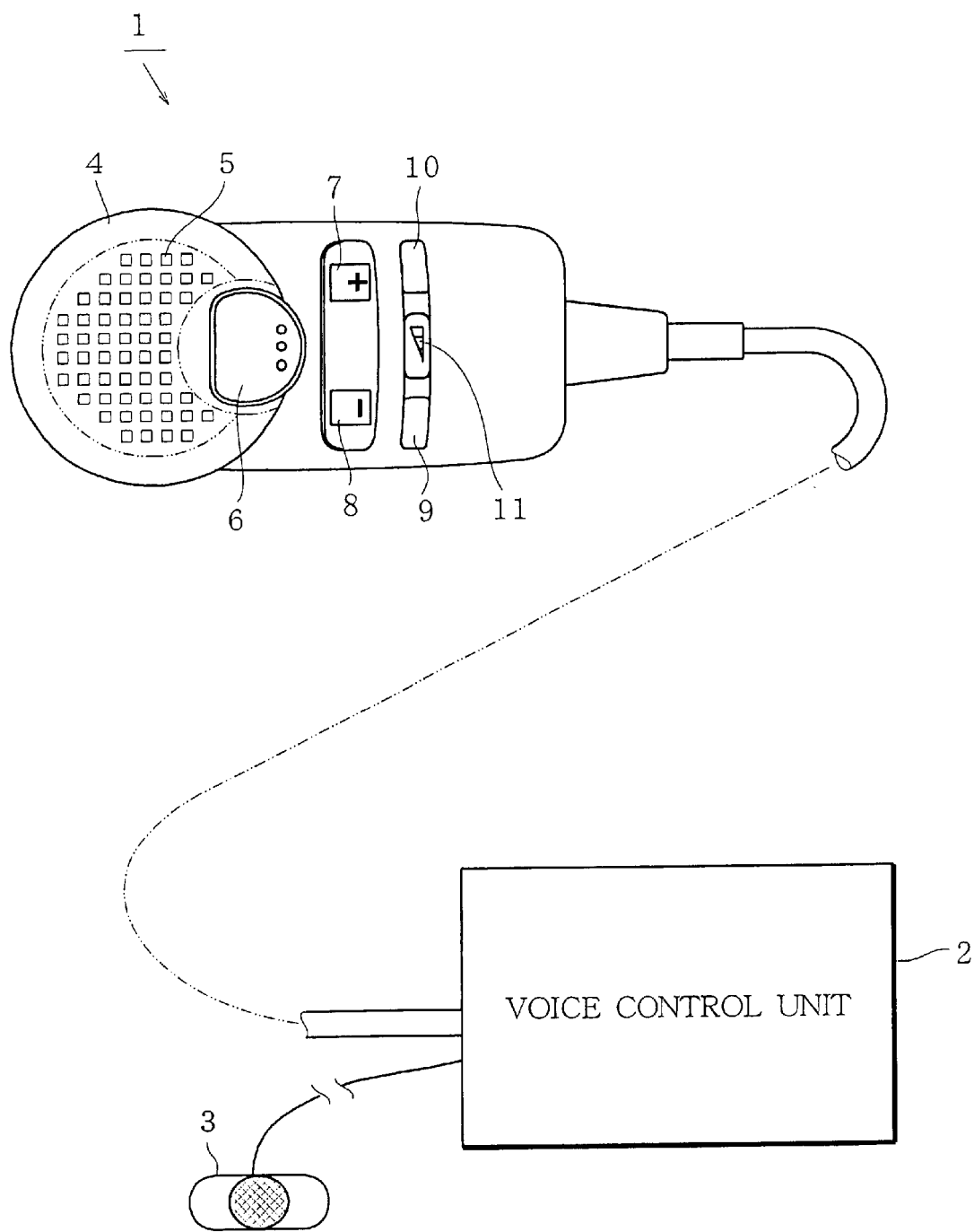
FIG. 1 is a plan view showing the outer appearance of a voice-based manipulation apparatus according to one embodiment of this invention.
Figure 2:
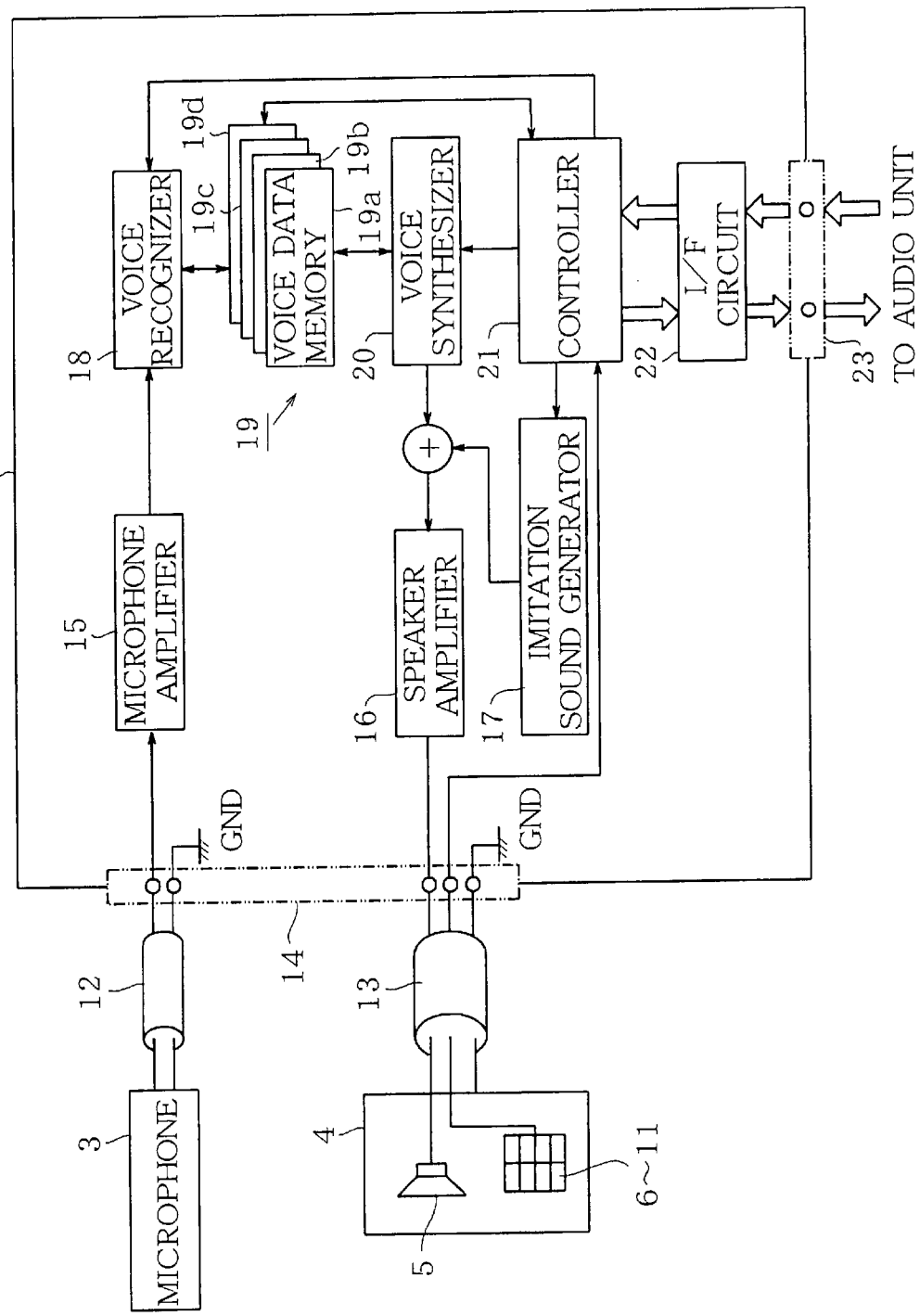
FIG. 2 is a block diagram illustrating the structure of a signal processor incorporated in a voice control unit.
Figure 5:
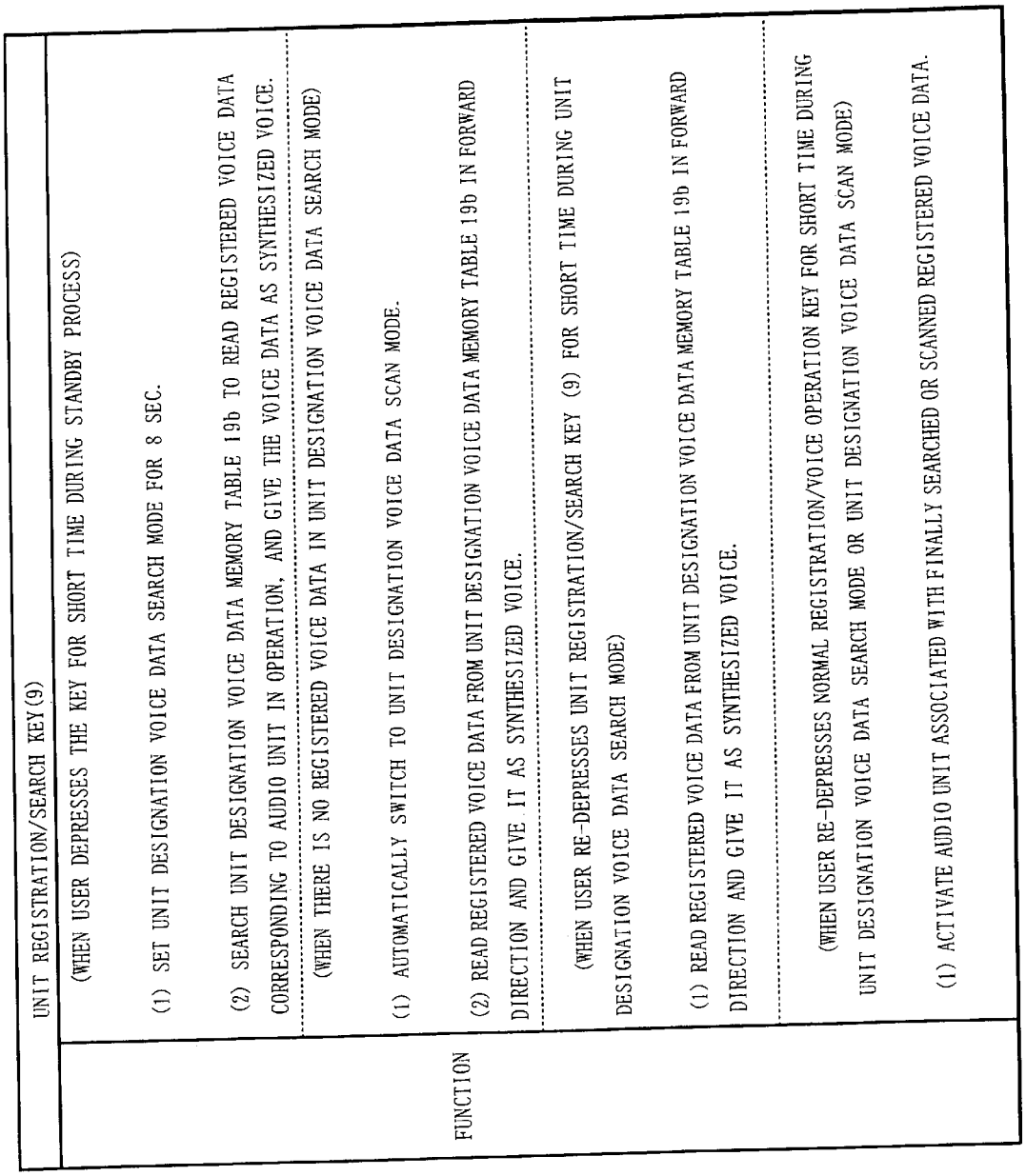
FIGS. 5A and 5B are explanatory diagrams illustrating the functions of a unit registration/search key.
Figure 7:
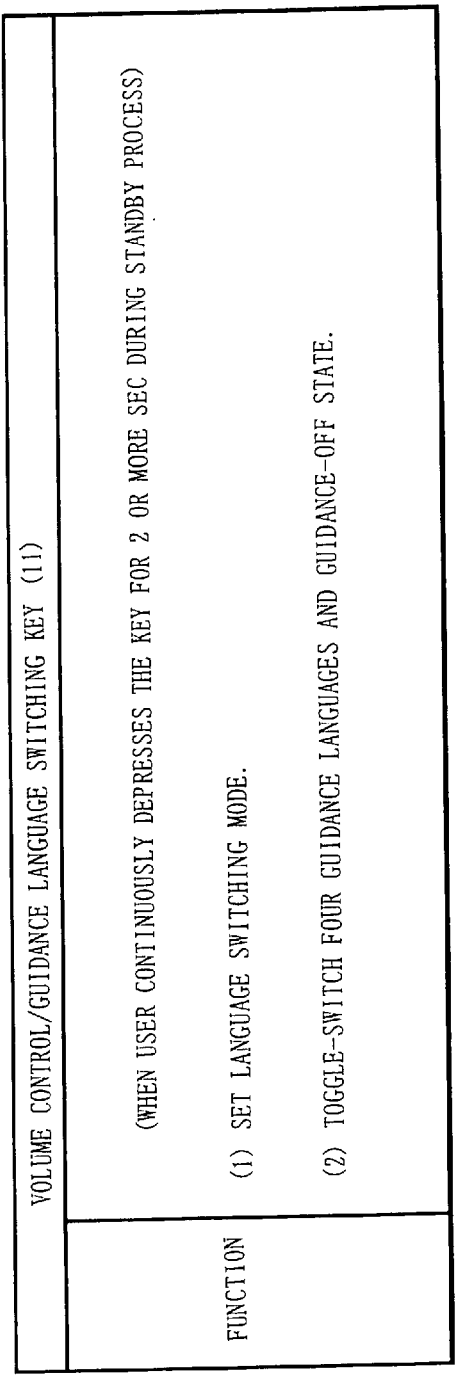
FIGS. 7A and 7B are explanatory diagrams illustrating the functions of a volume control/guidance language switching key.
Figure 7:
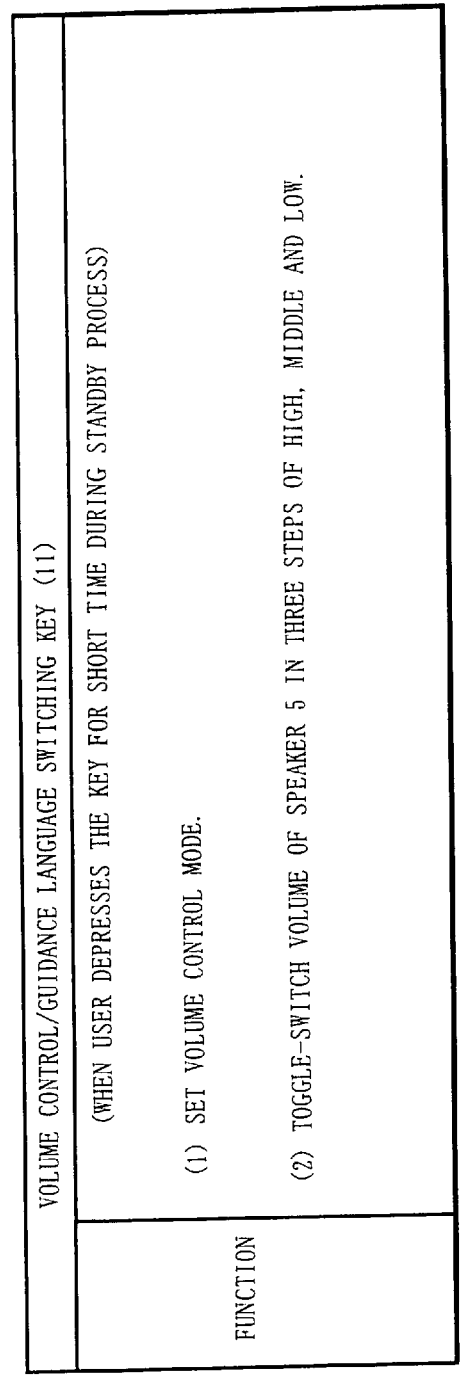

FIG. 1 shows the outer appearance of a voice-based manipulation apparatus 1, and FIG. 2 illustrates the structure of a signal processor which is incorporated in a voice control unit 2.

Referring to FIG. 1, the voice-based manipulation apparatus 1 comprises the voice control unit 2, which is the main unit to control the aforementioned individual audio units, a microphone 3 through which a user inputs a voice to give an instruction to the voice control unit 2, and a remote operation section 4.

The remote operation section 4 has a small speaker 5 and push-button type operational button switches 6 to 11. The operational button switch 6 is called a "normal registration/voice-based operation key", the operational button switch 7 a "search/forward scan key", the operational button switch 8 a "search/reverse scan key", the operational button switch 9 a "unit registration/search key", the operational button switch 10 an "equalizer-adjustment voice registration/search key", and the operational button switch 11 a "volume control/guidance language switching key". Those keys have predetermined functions which will be discussed later.

As shown in FIG. 2, the microphone 3 and the remote operation section 4 are connected to a connector 14 of the voice control unit 2 via connection cables 12 and 13, respectively.

Referring to FIG. 2, the voice control unit 2 includes an amplifier (microphone amplifier) 15, a speech recognizer 18 and a voice data memory 19. As the user utters words, a voice signal is supplied from the microphone 3 to the microphone amplifier 15 via the connection cable 12. The microphone amplifier 15 amplifies the voice signal and sends it to the speech recognizer 18. The speech recognizer 18 performs speech recognition on the received voice signal. The voice data memory 19, which is a non-volatile memory, stores voice data recognized by the speech recognizer 18.

The voice data memory 19 has a title designation voice data memory table 19a, a unit designation voice data memory table 19b, an equalizer-adjustment voice data memory table 19c, and a guidance data memory table 19d. The first three tables 19a to 19c store the voice data supplied from the speech recognizer 18. The last table 19d prestores voice guidance data for generating voice guidances which will be discussed later.

As exemplarily shown in FIG. 3A, the title designation voice data memory table 19a is provided to store (register) information, such as a musical piece, which is being played by an active or currently operating audio unit, its title and the channel frequency of a broadcasting station, in association with data of voices uttered by the user (voice data). The unit designation voice data memory table 19b, as exemplarily shown in FIG. 3B, serves to store (register) the name of an audio unit in operation in association with data of voices uttered by the user (voice data). As exemplarily shown in FIG. 3C, the equalizer-adjustment voice data memory table 19c serves to store (register) information on the setting state of the. equalizer and the set positioning in association with data of voices uttered by the user (voice data).

The voice control unit 2 further includes an amplifier (speaker amplifier) 16, an imitation sound generator 17, a voice synthesizer 20, a controller 21, an interface (I/F) circuit 22 and an interface port 23.

The imitation sound generator 17 generates an imitation sound signal, such as "Peep" or "Beep". The voice synthesizer 20 generates a guidance voice signal based on the voice data or the voice guidance data stored in the voice data memory 19. The speaker amplifier 16 amplifies those guidance voice signal and imitation sound signal and sends the amplified signals via the connection cable 13 to the speaker 5 in the remote operation section 4.

The controller 21 receives operation signals from the individual operational button switches 6–11 via the connection cable 13 and controls the individual audio units. The I/F circuit 22 and the interface port 23 permit bidirectional communications between the controller 21 and each audio unit.

The controller 21 is provided with a microprocessor which runs a preset system program to control the general operation of the voice-based manipulation apparatus 1 and the operations of the individual audio units.

The operation of the voice-based manipulation apparatus 1 with the above-described structure will be discussed below referring to FIGS. 3A to 15B. FIGS. 3A through 3C respectively show the individual memory maps of the title designation voice data memory table 19a, the unit designation voice data memory table 19b and the equalizer-adjustment voice data memory table 19c. FIGS. 4A through 9B are explanatory diagrams illustrating the functions of the operational button switches 6–11. FIGS. 10 through 15 are flowcharts for explaining operational examples of the voice-based manipulation apparatus 1 when the user operates the operational button switches 6–11.

As illustrated in FIGS. 4A through 9B, when the user depresses one of the operational button switches 6–11 for a short time or for 2 or more seconds, the mode that matches with the user's operation is set.

According to this embodiment, the modes are classified into three kinds of modes: a registration mode for previously registering voice data necessary for voice-based manipulations in the title designation voice data memory table 19a, the unit designation voice data memory table 19b and the equalizer-adjustment voice data memory table 19c; an operation mode for ensuring voice-based manipulations as the user utters voices corresponding to the voice data that are registered in those voice data memory tables 19a–19c; and a search mode for allowing the user to check the voice data registered in those voice data memory tables 19a–19c.

Figure 10:
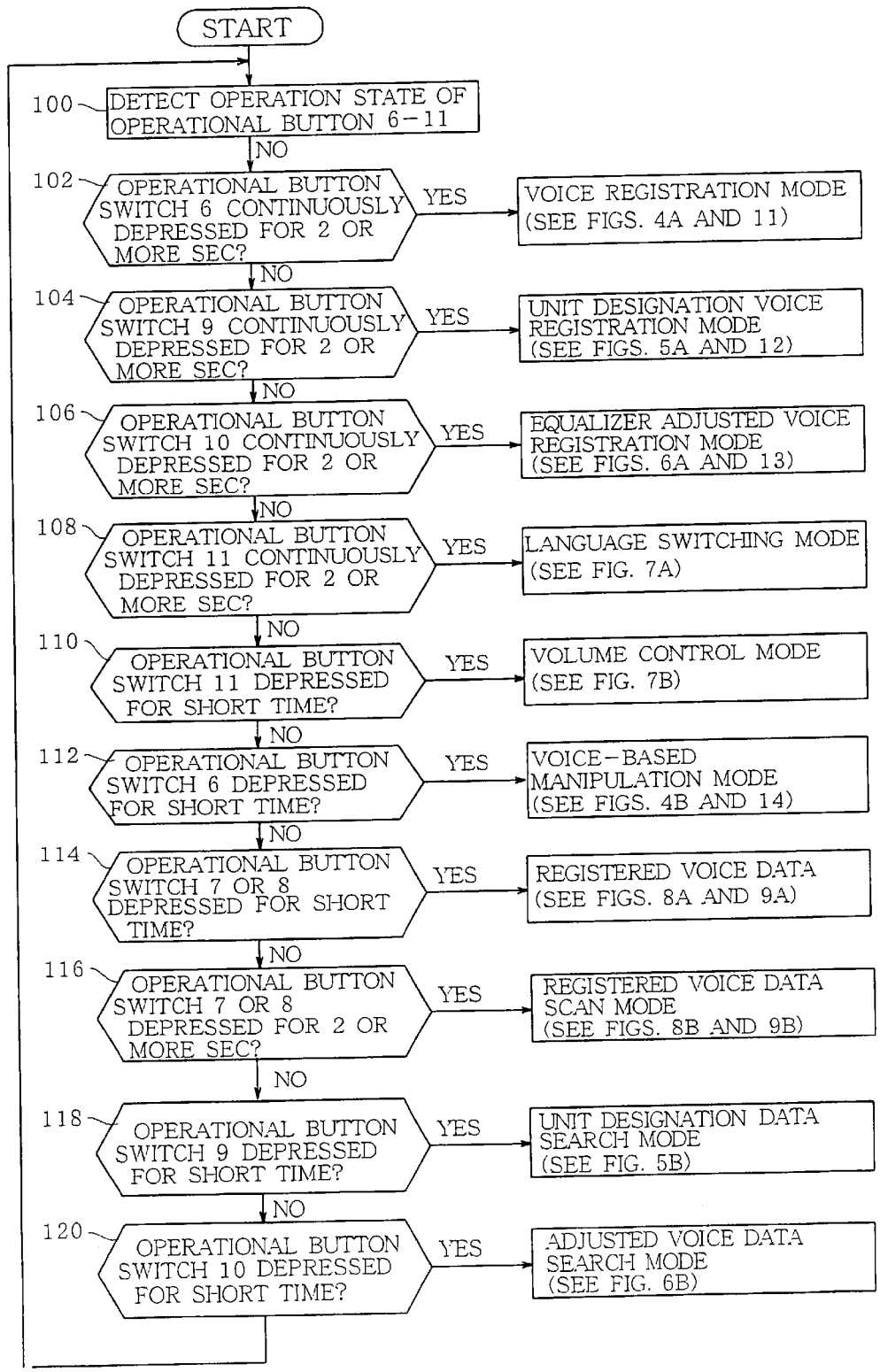
FIG. 10 is a flowchart illustrating the operation of the voice-based manipulation apparatus according to this embodiment in standby mode.

In FIG. 10, as the main power source of an on-board audio system is switched on, the voice-based manipulation apparatus 1 is automatically powered on and the controller 21 stands by until one of the operational button switches 6–11 is operated (steps 100 to 120). When the user manipulates one of the operational button switches 6–11 for a short time or for 2 or more seconds during this standby process, the mode that corresponds to the user's operation is set, as shown in FIGS. 4A through 9B.

Figure 11:
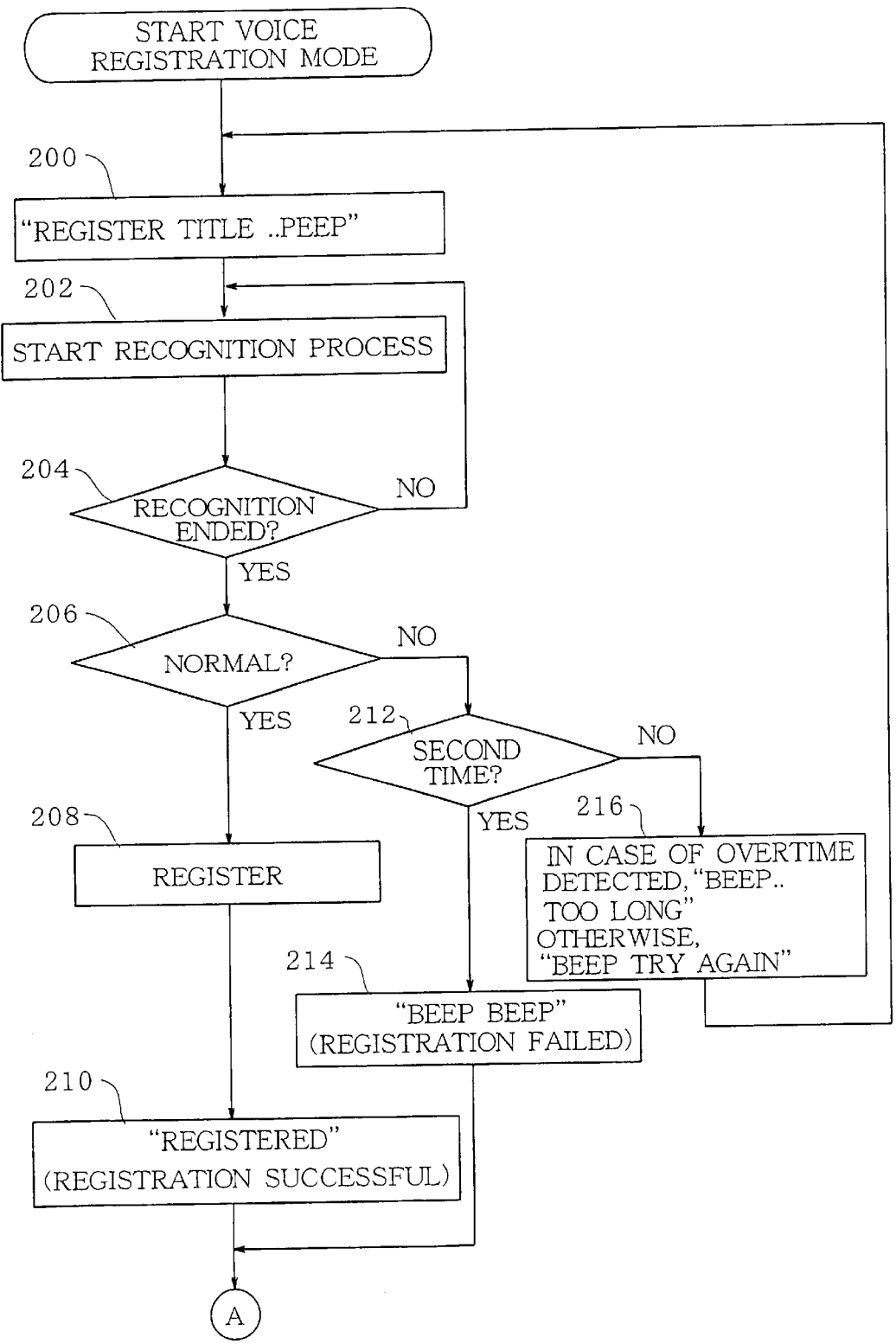
FIG. 11 is a flowchart showing the operation of the apparatus in voice registration mode.
Figure 12:
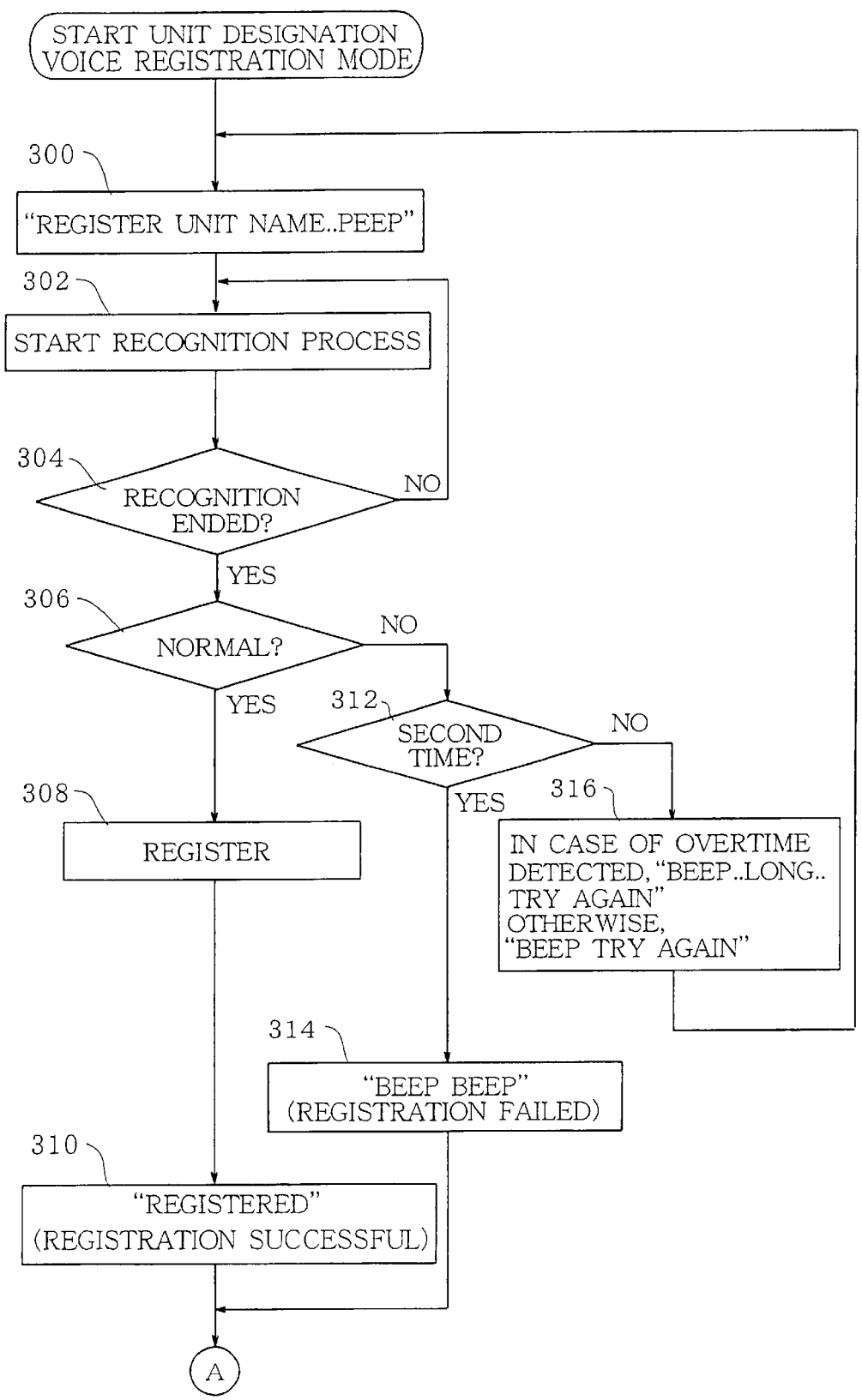
FIG. 12 is a flowchart showing the operation of the apparatus in unit designation voice registration mode.
Figure 13:
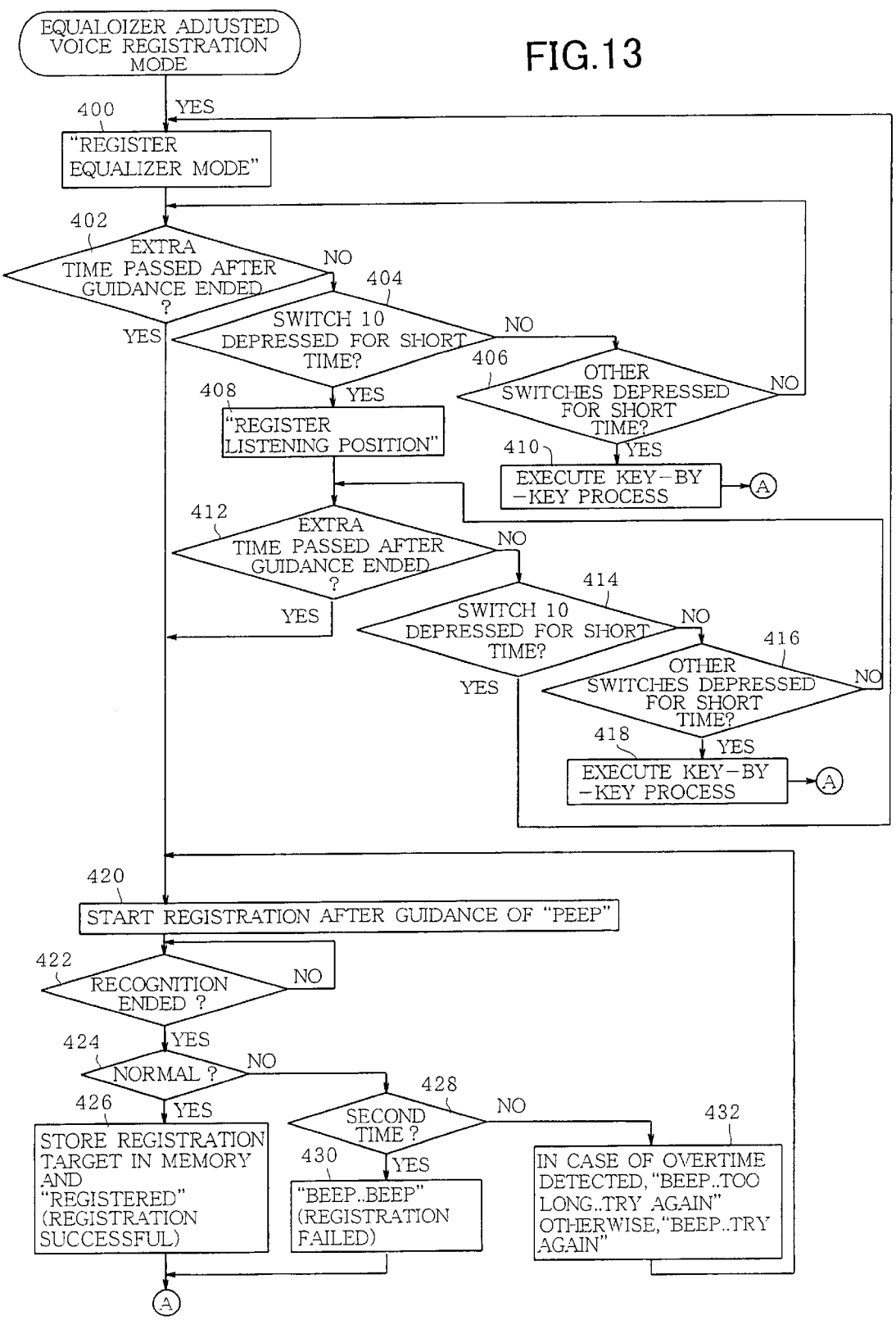
FIG. 13 is a flowchart showing the operation of the apparatus in equalizer-adjustment voice registration mode.

When it is determined in step 102 that the normal registration/voice-based operation key 6 has been continuously depressed for 2 or more seconds, the mode is set to the voice registration mode and the operation goes to a routine shown in FIG. 11. In voice registration mode, first, the controller 21 sets "1" to a program counter constructed by the system program and carries out a sequence of processes starting at step 200.

In step 200, the voice synthesizer 20 reads predetermined voice guidance data from the guidance data memory table 19d and generates a guidance voice signal, and the imitation sound generator 17 generates an imitation sound signal of "Peep".

The controller 21 supplies those guidance voice signal and imitation sound signal to the speaker amplifier 16 and reproduces "Register title . . . Peep", which is a guidance sound comprised of a guidance voice and imitation sound, from the speaker 5, requesting the user to utter a voice to be registered.

In the next step 202, the speech recognizer 18 initiates a speech recognition process. When the user utters desired words in response to the guidance sound, the speech recognizer 18 detects the beginning of this voice generation, at which point a program timer in the controller 21 is activated so that the speech recognizer 18 is controlled to execute speech recognition of the voice uttered within 2.5 seconds.

More specifically, before giving the guidance sound, the speech recognizer 18 measures sounds (power of ambient sounds) which are picked up by the microphone 3 and are input via the microphone amplifier 15, and sets the power level of the ambient sounds as a noise level. The output signal of the microphone amplifier 15 is added up every 10 milliseconds. Each added value is measured as a sound power level, and then a first threshold value THD1, which is higher than the power level of the ambient sounds, is set every 10 milliseconds.

When the user utters a voice, the speech recognizer 18 compares the level of the uttered voice (voice power) with the latest first threshold value THD1 and determines the point when the level of the uttered voice becomes greater than the first threshold value THD1 as the beginning of voice generation. The program timer is activated at the beginning of voice generation, and the speech recognizer 18 recognizes the voice uttered within 2.5 seconds and generates voice data corresponding to the recognition result.

At this point, the speech recognizer 18 further compares the level of the uttered voice (voice power) with a second threshold value THD2 (fixed value) which is preset higher than the first threshold value THD1, and determines that speech recognition has been carried out properly when the voice power becomes greater than the second threshold value THD2. That is, when the level of the uttered voice becomes higher than the latest first threshold value THD1 and then becomes higher than the second threshold value THD2, the uttered voice is taken as the subject to be recognized. This allows the property of the uttered voice which is less influenced by noise to be extracted accurately, thus improving the precision of speech recognition.

In the next step 204, it is determined from the action of the timer or a variation in level whether or not speech recognition has been completed. Then, it is determined if speech recognition has been performed properly in step 206. This decision is made by checking if the level of the uttered voice (voice power) input as a recognition target has been higher than the first and second threshold values THD1 and THD2. When it is determined that speech recognition has been done properly, the flow goes to step 208.

In step 208, the controller 21 receives information of an audio unit in operation and information which is currently reproduced by that audio unit via the I/F circuit 22 and the interface port 23, and stores the received data and the voice data generated by the speech recognizer 18 in the title designation voice data memory table 19a in association with each other (in combination).

Suppose that the audio unit in operation is a CD player which is currently playing a musical piece or the like on track 1 of a recording/reproducing medium (CD). If the user utters a word "one" in step 202, the received data becomes "disc1 track1" and the voice data has word information of "one". Those received data and voice data are stored (registered) as registered voice data in the title designation voice data memory table 19a in association with each other.

As another example, suppose that the audio unit in operation is a radio tuner which is currently tuned to a broadcasting station having a channel frequency of 76.1 MHz. If the user utters a word "seven" in step 202, the received data about the channel frequency of 76.1 MHz and the voice data "seven" are stored (registered) as registered voice data in the title designation voice data memory table 19a in association with each other.

In other words, in voice registration mode, voice data corresponding to the voice uttered by the user is registered in the title designation voice data memory table 19a in association with information, such as the musical piece that is currently played by an audio unit in operation and the title of the musical piece or the received channel frequency, as shown in FIG. 3A.

When the registration of voice data is completed, the flow advances to step 210 where the voice synthesizer 20 reads predetermined voice guidance data from the guidance data memory table 19d and generates a guidance voice signal. The controller 21 supplies the guidance voice signal to the speaker amplifier 16 and reproduces a guidance sound, "Registered", from the speaker 5, informing the user of the end of the registration. After the voice registration mode is completed, the operation goes again to the standby mode and starts the routine in FIG. 10 again at step 100.

When it is determined in step 206 that speech recognition has not been done properly, the flow moves to step 212. In step 212, the controller 21 checks the value of the program counter to determine if the check is the second time. If it is the second time, the flow goes to step 214.

In step 214, the imitation sound generator 17 generates an imitation sound signal of "Beep Beep". The controller 21 sends this imitation sound signal of "Beep Beep" to the speaker amplifier 16 and then outputs a guidance sound of "Beep Beep" from the speaker 5, notifying registration failure. When the voice registration mode is ended, the operation comes again to the standby mode and starts the routine in FIG. 10 again at step 100. In other words, if the property of the uttered voice cannot be extracted accurately due to the influence of noise or the like, the user should perform the registering operation from the start.

When it is determined in step 212 that the value of the program counter is "1", the flow goes to step 216. In step 216, the measured value of the program timer is checked to determine whether or not the voice registration has taken 2.5 seconds or longer.

When the voice registration has taken 2.5 seconds or longer, the voice synthesizer 20 reads predetermined voice guidance data from the guidance data memory table 19d and generates a guidance voice signal, and the imitation sound generator 17 generates an imitation sound signal of "Beep". The controller 21 supplies those guidance voice signal and imitation sound signal to the speaker amplifier 16 and reproduces "Beep . . . Too long" from the speaker 5, warning the user that the time for the voice registration is too long.

If the voice registration mode has not been carried out properly due to some other factors, the voice synthesizer 20 reads predetermined voice guidance data from the guidance data memory table 19d and generates a guidance voice signal, and the imitation sound generator 17 generates an imitation sound signal of "Beep". Then, the controller 21 supplies those guidance voice signal and imitation sound signal to the speaker amplifier 16 and reproduces "Beep . . . Try again" from the speaker 5, requesting the user to make voice input again.

When this notification is completed, "2" is set in the program counter and the operation restarts at step 200 to allow the user to utter desired words again. In other words, the step 216 mainly gives a warning to the effect that the way the user utters a voice by has not been adequate. When the user properly utters intended words again in response to this warning, the voice data is registered in step 208. Therefore, the user can register adequate voice data without manipulating the normal registration/voice-based operation key 6 again, which demonstrates an improved operability.

Once the user continuously depresses the normal registration/voice-based operation key 6 for 2 or more seconds, merely uttering words according to a guidance sound can cause the words uttered by the user to be registered in the title designation voice data memory table 19a in association with information, such as the musical piece that is currently played by an audio unit in operation and the title of the musical piece or the channel frequency of a broadcasting station. That is, it is possible to make voice registration of the information itself that the user wants, not the name of an audio unit. After this registering operation, the user has only to utter words corresponding to any registered voice data in order to ensure voice-based manipulation (whose details will be given later) for designating the musical piece, the title thereof, the broadcasting station and so forth.

A description will now be given of the operation in the case where it is determined in step 104 that the unit registration/search key 9 has been continuously depressed for 2 or more seconds. When the depression of this key 9 continues for 2 or more seconds, the mode is set to the unit designation voice registration mode and the operation goes to a routine shown in FIG. 12.

In unit designation voice registration mode, first, the controller 21 sets "1" to the program counter constructed by the system program and carries out a sequence of processes starting at step 300.

In step 300, as in step 200 in FIG. 11, a guidance sound of "Register unit name . . . Peep" is reproduced, requesting the user to utter a voice to be registered.

In the next step 302, as in step 202, the speech recognizer 18 initiates a speech recognition process. When the user utters desired words in response to the guidance sound, the speech recognizer 18 detects the beginning of this voice generation, at which point the program timer in the controller 21 is activated so that the speech recognizer 18 is controlled to execute speech recognition of the voice uttered within 2.5 seconds.

After the end of speech recognition is confirmed in the next step 304, it is determined in step 306 if speech recognition has been performed properly as done in step 206. When it is determined that speech recognition has been done properly, the flow goes to step 308.

In step 308, the controller 21 detects an audio unit in operation and stores the detected data and the voice data generated by the speech recognizer 18 in the unit designation voice data memory table 19b in association with each other (in combination).

Assuming that the audio unit in operation is a CD player, when the user utters a word "CD" (si:di:) in step 302, the detected data becomes "cd" and the voice data has word information of "si:di:". Those detected data and voice data are stored as registered voice data in the unit designation voice data memory table 19b in association with each other.

Assuming that the audio unit in operation is a radio tuner, as another example, when the user utters a word "tuner" (t(j)u:nθ∂r) in step 302, the detected data becomes "t(j)u:nθ∂r" and those detected data and voice data are stored as registered voice data in the unit designation voice data memory table 19b in association with each other.

In other words, in unit designation voice registration mode, voice data corresponding to the voice uttered by the user is registered in the unit designation voice data memory table 19b in association with the name of the audio unit in operation, as shown in FIG. 3B.

When the registration of voice data is completed, the flow advances to step 310 where, as in step 210, a guidance sound of "Registered" is output from the speaker 5, informing the user of the end of the registration. After the voice registration mode is completed, the operation goes again to the standby mode and starts the routine in FIG. 10 again at step 100.

When it is determined in step 306 that speech recognition has not been done properly, the flow moves to step 312. In step 312, as in step 212, the controller 21 checks the value of the program counter to determine if the check is the second time. If it is the second time, the flow goes to step 314.

In step 314, as in step 214, a guidance sound of "Beep Beep" is reproduced from the speaker 5, notifying registration failure. When the voice registration mode is ended, the operation comes again to the standby mode and starts the routine in FIG. 10 again at step 100. That is, if the property of the uttered voice cannot be extracted accurately due to the influence of noise or the like, the user should perform the registering operation from the start.

When it is determined in step 312 that the value of the program counter is "1", the flow goes to step 316. In step 316, as in step 216, it is determined whether or not the voice registration has taken less than 2.5 seconds. When the voice registration has taken 2.5 seconds or longer, a guidance sound of "Beep . . . Too long" is reproduced from the speaker 5, warning the user that the time for the voice registration is too long. If the voice registration mode has not been carried out properly due to some other factors, a guidance sound of "Beep . . . Try again" is reproduced from the speaker 5, requesting the user to make voice input again.

When this notification is completed, "2" is set in the program counter and the operation restarts at step 300 to allow the user to utter desired words again. In other words, the step 316 mainly gives a warning to the effect that the way the user utters a voice by has not been adequate. When the user properly utters intended words again in response to this warning, the voice data is registered in step 308. Therefore, the user can register adequate voice data without manipulating the unit registration/search key 9 again, thus leading to an improved operability.

Once the user continuously depresses the unit registration/search key 9 for 2 or more seconds, merely uttering words according to a guidance sound can cause the uttered words to be registered in the unit designation voice data memory table 19b in association with the name of the audio unit in operation. After this registering operation, the user has only to utter words corresponding to any registered voice data in order to ensure voice-based manipulation (whose details will be given later) for designating an audio unit.

A description will now be given of the operation in the case where it is determined in step 106 that the equalizer-adjustment voice registration/search key 10 has been continuously depressed for 2 or more seconds. When the depression of this key 10 continues for 2 or more seconds, the mode is set to the equalizer-adjustment voice registration mode and the operation goes to a routine shown in FIG. 13.

First, the voice synthesizer 20 reproduces a guidance sound of "Register equalizer mode" in step 400. In the next step 402, the controller 21 restarts the program counter constructed by the system program to measure the time for one second. It is determined in steps 404 and 406 within this one second if the equalizer-adjustment voice registration/search key 10 has been depressed for a short time or any one of the other operation keys 6–9 and 11 has been depressed for a short time.

When it is the equalizer-adjustment voice registration/search key 10 that has been depressed for a short time, the flow goes to step 408. When it is one of the other operation keys 6–9 and 11 that has been depressed for a short time, the flow goes to step 410. When none of the operation keys 6–11 has been manipulated within one second, the flow goes to step 420.

When it is determined in step 406 that a key other than the equalizer-adjustment voice registration/search key 10, i.e., one of the other operation keys 6–9 and 11 has been depressed for a short time, and the flow goes to step 410, a process corresponding to the depressed operation key is performed, and the flow returns to step 100 in FIG. 10.

When it is determined in step 404 that the equalizer-adjustment voice registration/search key 10 has been depressed for a short time, and the flow goes to step 408, the voice synthesizer 20 reproduces a guidance sound of "Register listening position" after which the flow moves to step 412. In step 412, the program timer is restarted to measure the time for one second.

In steps 414 and 416, it is determined within this one second whether the equalizer-adjustment voice registration/search key 10 or one of the other operation keys 6–9 and 11 has been depressed for a short time. When the equalizer-adjustment voice registration/search key 10 has been depressed for a short time, the flow returns to step 400. When one of the other operation keys 6–9 and 11 has been depressed for a short time, a process corresponding to the depressed key is performed, then the flow returns to step 100 in FIG. 10.

In steps 402–418, when the equalizer-adjustment voice registration/search key 10 is depressed once for a short time, the mode is set to a voice registration mode for setting the frequency characteristic of the equalizer as an audio unit, and when the second depression of the equalizer-adjustment voice registration/search key 10 is made within the first one second, the mode is set to a voice registration mode for setting each output level (listening position) of each channel of the stereo speaker, before the flow advances to step 420.

When a key different from the equalizer-adjustment voice registration/search key 10, i.e., one of the operation keys 6–9 and 11 is depressed for a short time within the first one second or within the next one second, a process corresponding to the depressed key is carried out.

In the subsequent step 420, the voice synthesizer 20 reproduces a guidance sound of "Peep" to inform the user of the beginning of registration. In step 422, the speech recognizer 18 performs speech recognition on the voice uttered by the user in accordance with that guidance sound. In this case, accurate speech recognition is executed by extracting the uttered voice based on the first and second threshold values THD1 and THD2, as in the case illustrated in FIGS. 11 and 12.

Then, it is determined in step 424 if speech recognition has been carried out properly. When speech recognition has been performed adequately, the flow goes to step 426.

In step 426, the controller 21 detects the present setting state of the equalizer via the I/F circuit 22 and the interface port 23 and stores the detected data and the voice acquired by the speech recognition in the equalizer-adjustment voice data memory table 19c in association with each other (in combination).

When the operation goes to step 420 from step 402, i.e., when the user has instructed the voice registration mode for setting the frequency characteristic of the equalizer and the user has adjusted the equalizer to "super bass" and utters words "super bass" (s(j)u:per baés), then the state of the "super bass" of the equalizer and the voice data of "super bass" are stored in the equalizer-adjustment voice data memory table 19c.

When the operation goes to step 420 from step 412, i.e., when the user has instructed the voice registration mode for setting the listening position and the user has adjusted the state of the speaker output to "front right" and utters a word "right" (rait), then the state of the "front right" and the voice data of "right" are stored in the equalizer-adjustment voice data memory table 19c.

Then, in step 426, a guidance sound of "Registered" is reproduced from the speaker 5, notifying the user of the end of the registration. After the voice registration mode is completed, the operation goes again to the standby mode and starts the routine in FIG. 10 again at step 100.

When it is determined in step 424 that speech recognition has not been done properly, the flow moves to step 428, but when it is the second time, the flow goes to step 430, as done in step 212 in FIG. 11.

In step 430, as in step 214, a guidance sound of "Beep Beep" is reproduced from the speaker 5, notifying registration failure. When the voice registration mode is ended, the operation comes again to the standby mode and starts the routine in FIG. 10 again at step 100. That is, if the property of the uttered voice cannot be extracted accurately due to the influence of noise or the like, the user should perform the registering operation from the start.

When it is determined in step 428 that the value of the program counter is "1", the flow goes to step 432 where, as in step 216, it is determined whether or not the voice registration has taken less than 2.5 seconds. When the voice registration has taken 2.5 seconds or longer, a guidance sound of "Beep . . . Too long" is reproduced from the speaker 5, warning the user that the time for the voice registration is too long. If the voice registration mode has not been carried out properly due to some other factors, a guidance sound of "Beep . . . Try again" is reproduced from the speaker 5, requesting the user to make voice input again.

When this notification is completed, the operation restarts at step 420 to allow the user to utter desired words again. Therefore, the user can register adequate voice data without manipulating the equalizer-adjustment voice registration/search key 10 again. This results in an improvement of the operability. Once the user depresses the equalizer-adjustment voice registration/search key 10, merely uttering words according to a guidance sound can cause the uttered words to be registered in the equalizer-adjustment voice data memory table 19c in association with the current adjustment state of the equalizer. After this registering operation, the user has only to utter words corresponding to any registered voice data in order to ensure voice-based manipulation (whose details will be given later) for adjusting the equalizer.

A description will now be given of the operation in the case where it is determined in step 108 in FIG. 10 that the volume control/guidance language switching key 11 has been continuously depressed for 2 or more seconds. When the depression of this key 11 continues for 2 or more seconds, the mode is set to the language switching mode and the controller 21 changes the voice guidance data stored in the guidance data memory table 19d and performs some setting to turn off the generation of a guidance sound, as shown in FIG. 7A. The guidance data memory table 19d prestores voice guidance data in plural countries, such as English, German and French, in addition to voice guidance data in Japanese. Every time the volume control/guidance language switching key 11 is depressed for 2 or more seconds, the controller 21 sequentially controls the changing of the voice guidance data in each country and the disabling of the generation of a guidance sound. Therefore, the user can set the language of guidance voices to a desired country's language and set off guidance voices by operating the volume control/guidance language switching key 11.

A description will now be given of the operation in the case where it is determined in step 110 in FIG. 10 that the volume control/guidance language switching key 11 has been depressed for a short time. When the depression of this key 11 continues for a short time, the mode is set to the volume control mode and the controller 21 sequentially switches the amplification factor of the speaker amplifier 16 within the range of three levels of high, middle and low as shown in FIG. 7B. Therefore, the user can adjust the output volume of the speaker 5 to one of the high volume, middle volume and low volume by operating the key 11.

A description will now be given of the operation in the case where it is determined in step 112 in FIG. 10 that the normal registration/voice-based operation key 6 has been for a short time.

Figure 14:
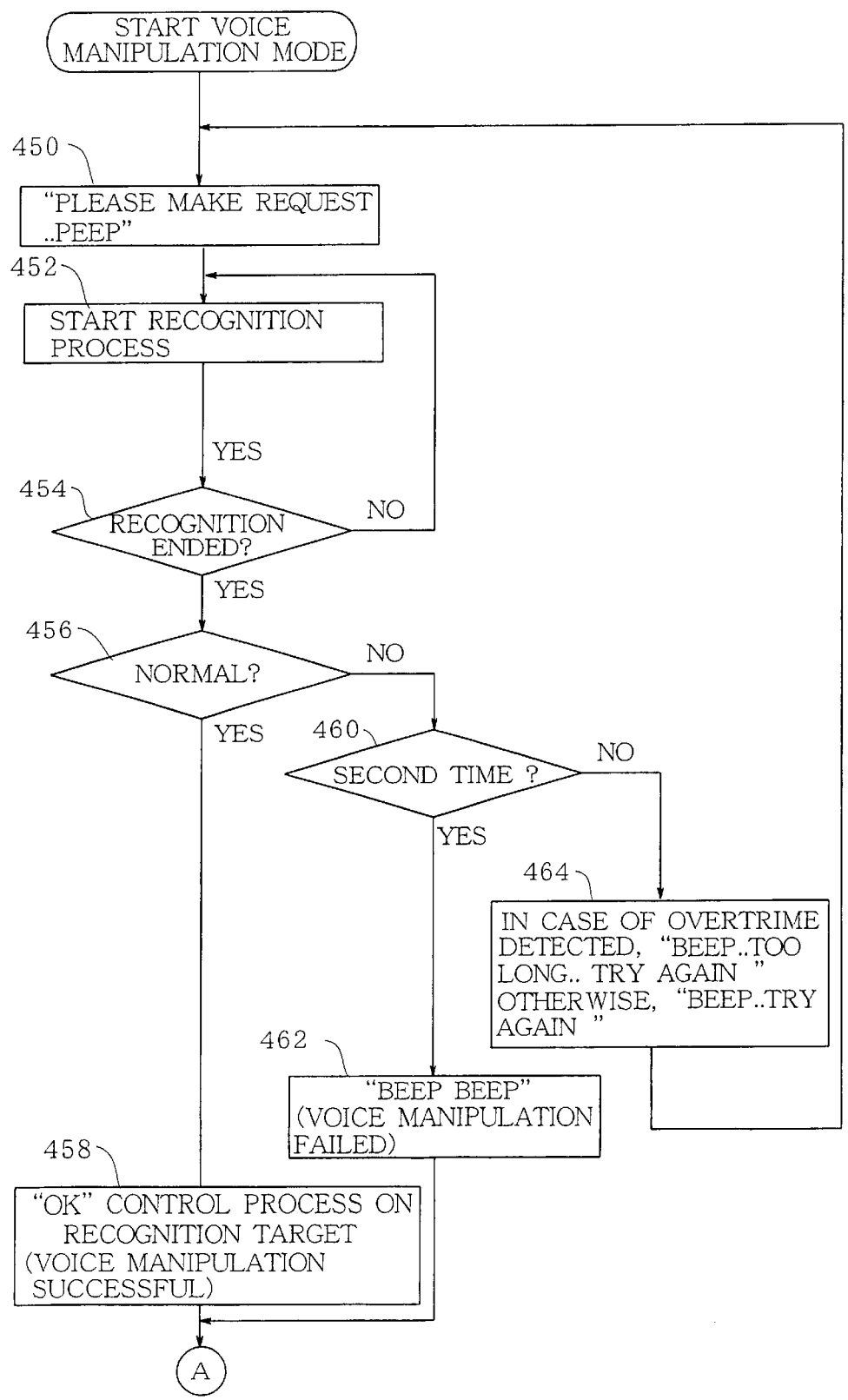
FIG. 14 is a flowchart illustrating the operation of the apparatus in voice-based manipulation mode.
Figure 15:
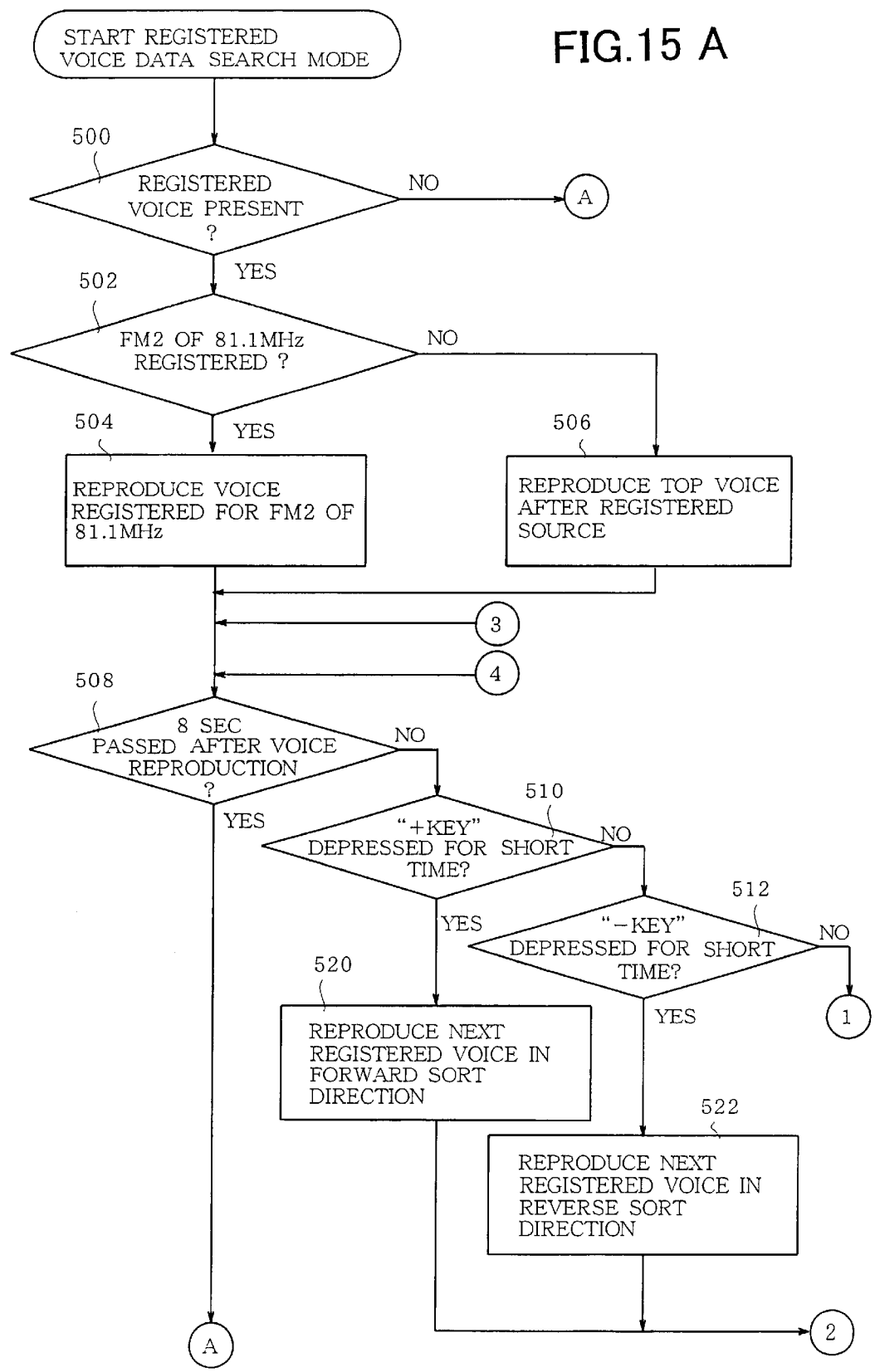
FIGS. 15A and 15B are flowcharts illustrating the operation of the apparatus in registered voice data search mode.
Figure 15:
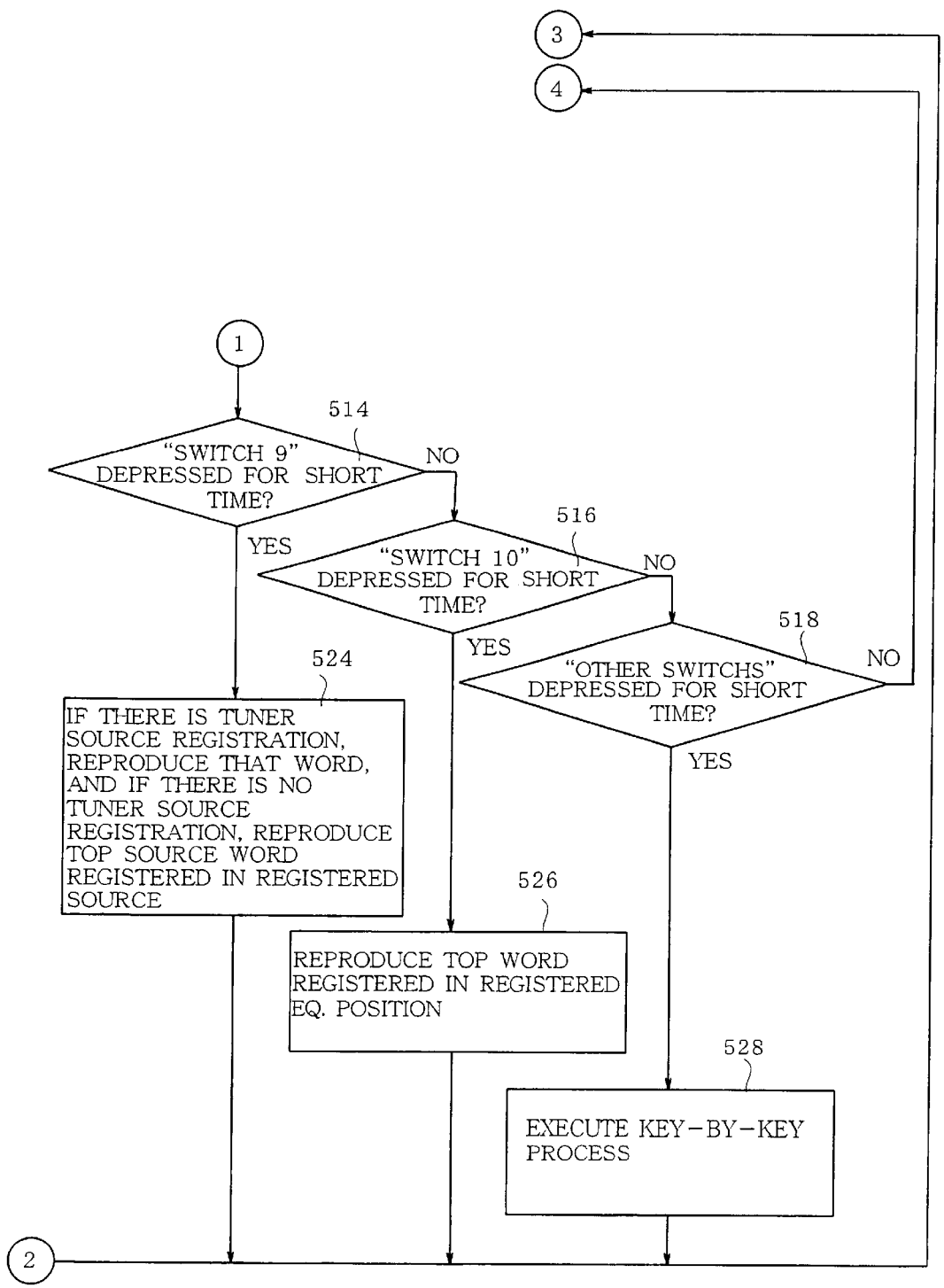

When the normal registration/voice-based operation key 6 is depressed for a short time, the mode is set to the voice-based manipulation mode and the operation goes to a routine shown in FIG. 14. In FIG. 14, first, the controller 21 sets "1" in the program counter and performs a sequence of processes starting at step 450.

In step 450, the voice synthesizer 20 reads predetermined voice guidance data from the guidance data memory table 19d and the imitation sound generator 17 generates an imitation sound signal of "Peep".

The controller 21 sends those guidance voice signal and imitation sound signal to the speaker amplifier 16 and reproduces a guidance sound of "Please make request . . . Peep", which consists of the guidance voice and imitation sound, from the speaker 5, thus requesting the user to utter a voice for voice-based manipulation.

In the next step 452, the speech recognizer 18 starts the speech recognition process. When the user utters an intended voice (words) corresponding to any of the voice data that are stored in the title designation voice data memory table 19a, the unit designation voice data memory table 19b and the equalizer-adjustment voice data memory table 19c, the speech recognizer 18 detects the beginning of the voice generation, at which point the program timer in the controller 21 is activated so that the speech recognizer 18 is controlled to execute speech recognition of the voice uttered within 2.5 seconds. In this case, accurate speech recognition is carried out by extracting the uttered voice based on the first and second threshold values THD1 and THD2, which are higher than the level of ambient noise, as in the case of the above-described voice registration mode.

In the next step 454, it is determined whether or not speech recognition has been completed. Then, it is determined if speech recognition has been performed properly in step 456. This decision is made by checking if the level of the uttered voice (voice power) input as a recognition target has been higher than the first and second threshold values THD1 and THD2. When it is determined that speech recognition has been done properly, the flow goes to step 458.

In step 458, the voice synthesizer 20 reads predetermined voice guidance data from the guidance data memory table 19d and the controller 21 sends this guidance voice signal to the speaker amplifier 16 to output a guidance sound of "OK" from the speaker 5, thus giving acknowledgement information to the user. Further, the controller 21 searches the registered voice data in the title designation voice data memory table 19a based on the voice data acquired through the speech recognition and acquires information about an audio unit corresponding to that voice data (the aforementioned registered, received data). Then, the controller 21 generates a control signal based on the acquired information, and sends the control signal via the I/F circuit 22 and the interface port 23 to the audio unit specified by the user, thereby activating the audio unit. Then, the voice-based manipulation mode is ended and the operation comes to the standby mode to start the routine in FIG. 10 again at step 100.

If the user utters a word "one" in step 452, the title designation voice data memory table 19a shown in FIG. 3A is searched for information of "disc1 track1". Then, the controller 21 controls the CD player corresponding to this information based on the control signal to reproduce a musical piece or the like on the track 1 of the recording/reproducing medium.

If the user utters a word "seven" in step 452, the title designation voice data memory table 19a is searched for information of "band fm1 76.1 MHz". Then, the controller 21 controls the radio receiver corresponding to this information based on the control signal to tune itself to the broadcasting station of 76.1 MHz.

If the user utters an intended voice (words) corresponding to any of the voice data stored in the shown in FIG. 3B and the equalizer-adjustment voice data memory table 19c shown in FIG. 3C, it is possible to perform a voice-based manipulation, such as activation of an associated audio unit or adjustment of the equalizer.

When it is determined in step 456 that speech recognition has not been done properly, the flow moves to step 460. In step 460, the controller 21 checks the value of the program counter to determine if the check is the second time. If it is the second time, the flow goes to step 462.

In step 462, the imitation sound generator 17 generates an imitation sound signal of "Beep Beep". The controller 21 sends this imitation sound signal of "Beep Beep" to the speaker amplifier 16 and then outputs a guidance sound of "Beep Beep" from the speaker 5, notifying registration failure. When the voice registration mode is ended, the operation comes again to the standby mode and starts the routine in FIG. 10 again at step 100. In other words, if the property of the uttered voice cannot be extracted accurately due to the influence of noise or the like, the user should perform the registering operation from the start.

When it is determined in step 460 that the value of the program counter is "1", the flow goes to step 464. Instep 464, the measured value of the program timer is checked to determine whether or not the voice registration has taken 2.5 seconds or longer.

When the voice registration has taken 2.5 seconds or longer, the voice synthesizer 20 reads predetermined voice guidance data from the guidance data memory table 19d and generates a guidance voice signal, and the imitation sound generator 17 generates an imitation sound signal of "Beep". Then, the controller 21 supplies those guidance voice signal and imitation sound signal to the speaker amplifier 16 and reproduces "Beep . . . Too long" from the speaker 5, warning the user that the time for the voice registration is too long.

If the voice registration mode has not been carried out properly due to some other factors, the voice synthesizer 20 reads predetermined voice guidance data from the guidance data memory table 19d and generates a guidance voice signal, and the imitation sound generator 17 generates an imitation sound signal of "Beep". Then, the controller 21 supplies those guidance voice signal and imitation sound signal to the speaker amplifier 16 and reproduces "Beep . . . Try again" from the speaker 5, requesting the user to make voice input again.

When this notification in step 464 is completed, "2" is set in the program counter and the operation restarts at step 450 to allow the user to utter desired words again. In other words, when the way the user utters a voice by has not been adequate, the user can perform a voice-based manipulation merely by uttering proper words, without manipulating the normal registration/voice-based operation key 6 again, as done in the voice registration mode.

Once the user continuously depresses the normal registration/voice-based operation key 6 for a short time, the user can manipulate a desired audio unit simply by uttering a voice (words) registered in any of the voice data memory tables 19a–19c in accordance with a guidance sound.

A description will now be given of the operation in the case where it is determined in step 114 in FIG. 10 that the search key 7 or 8 has been depressed for a short time. When a short depression of the key 7 or 8 occurs, the mode is set to the registered voice data search mode and the operation goes to a routine shown in FIGS. 15A and 15B.

In step 500, the controller 21 searches the title designation voice data memory table 19a to determine if there is registered voice data. When there is no registered voice data ("NO"), a guidance sound of "No voice registered" is given and then, the flow returns to step 100 in FIG. 10.

When there is registered voice data in step 500 ("YES"), however, the flow goes to step 502 to check a currently active audio unit and determine if registered voice data associated with that audio unit is present in the title designation voice data memory table 19a shown in FIG. 3A. When the currently active audio unit is the radio tuner which is receiving radio waves from the broadcasting station of 81.1 MHz, for example, it is determined whether or not there is registered voice data corresponding to the broadcasting station of 81.1 MHz.

Assuming that there is voice data of a word "eight" (eit) corresponding to the broadcasting station of 81.1 MHz as shown in FIG. 3A, then, the voice synthesizer 20 reads the voice data of "eight" and performs voice synthesizing and outputs a synthesized voice of "eight" from the speaker 5.

If there is no registered voice data associated with a currently active audio unit in step 502 ("NO"), the flow goes to step 506.

In the case where the search/forward scan key 7 has been depressed for a short time, the voice data associated with an active audio unit registered in the title designation voice data memory table 19a is read in the forward sort direction and is converted into synthesized voices, which are output from the speaker 5 one after another in step 506. In the case where the search/reverse scan key 8 has been depressed for a short time, the registered voice data associated with an active audio unit is read in the reverse sort direction and is converted into synthesized voices, which are output from the speaker 5 one after another.

Accordingly, the user can confirm voice data registered in the title designation voice data memory table 19a and can recheck the voice data even if the user has forgotten it.

In the next step 508, the controller 21 measures the time of 8 seconds by means of the program timer. In steps 510–518, the controller 21 determines if any of the other operational button switches 6–11 has been depressed for a short time within 8 seconds. When such a short key depression is detected, the controller 21 performs a process corresponding to the depressed key and then returns to step 100 in FIG. 10. When none of the operational button switches 6–11 has been depressed for a short time even after passing of 8 seconds, the operation directly returns to step 100 in FIG. 10 from step 508.

With the search/reverse scan key 8 depressed for a short time, when the search/forward scan key 7 is depressed for a short time in step 510, the flow goes to step 520. In step 520, voice data stored at a memory address apart by one address from the address of the last voice data produced as a synthesized voice in the forward sort direction is read out and is produced as a synthesized voice. Then, the flow returns to step 508.

With the search/forward scan key 7 depressed for a short time, when the search/reverse scan key 8 is depressed for a short time in step 512, the flow goes to step 522. In step 522, voice data stored at a memory address apart by one address from the address of the last voice data produced as a synthesized voice in the reverse sort direction is read out and is produced as a synthesized voice. Then, the flow returns to step 508.

That is, the order of presenting voice data registered in the title designation voice data memory table 19a is switched from one to the other in steps 520 and 522.

When the unit registration/search key 9 is depressed for a short time in step 514, the flow goes to step 524. In step 524, the unit designation voice data memory table 19b shown in FIG. 3B is searched to check if there is voice data corresponding to a currently active audio unit. If there is such voice data, this voice data is produced as a synthesized voice. When the currently active audio unit is the radio tuner, for example, a synthesized sound of a word "tuner" (t(j)u:n$\theta\partial$r) is produced. Then, the flow returns to step 508. When there is no corresponding voice data, the top voice data in the unit designation voice data memory table 19b is read out and then the flow returns to step 508.

When the equalizer-adjustment voice registration/search key 10 is depressed for a short time in step 516, the flow goes to step 526. In step 526, the equalizer-adjustment voice data memory table 19c shown in FIG. 3C is searched to check if there is registered voice data associated with the equalizer. If there is such voice data, this voice data is produced as a synthesized voice. Then, the flow returns to step 508. When there is no corresponding voice data, the top voice data in the equalizer-adjustment voice data memory table 19c is read out and then the flow returns to step 508.

When any of the other keys, 6 or 10, is depressed in step 518, the flow goes to step 528 to perform a process corresponding to each depressed key 6 or 10. Then, the flow moves to step 508.

Because the user can confirm voice data registered in the title designation voice data memory table 19a, the unit designation voice data memory table 19b and the equalizer-adjustment voice data memory table 19c by depressing any of the operational button switches 7, 8, 9 and 10 to set the registered voice data search mode, as apparent from the above, the user can check voice data again even if he or she has forgotten it.

Figure 8A:
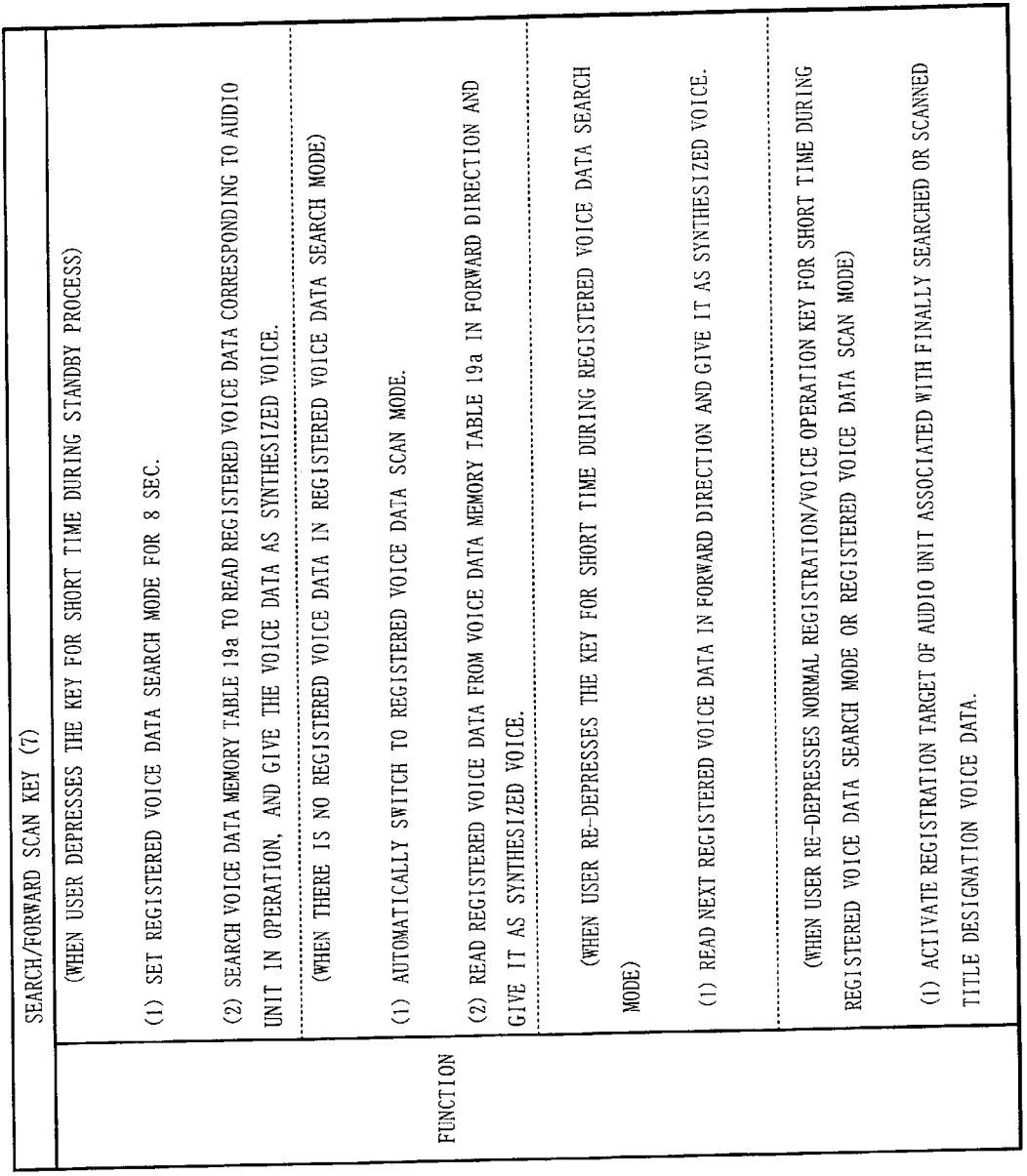
Figure 9:
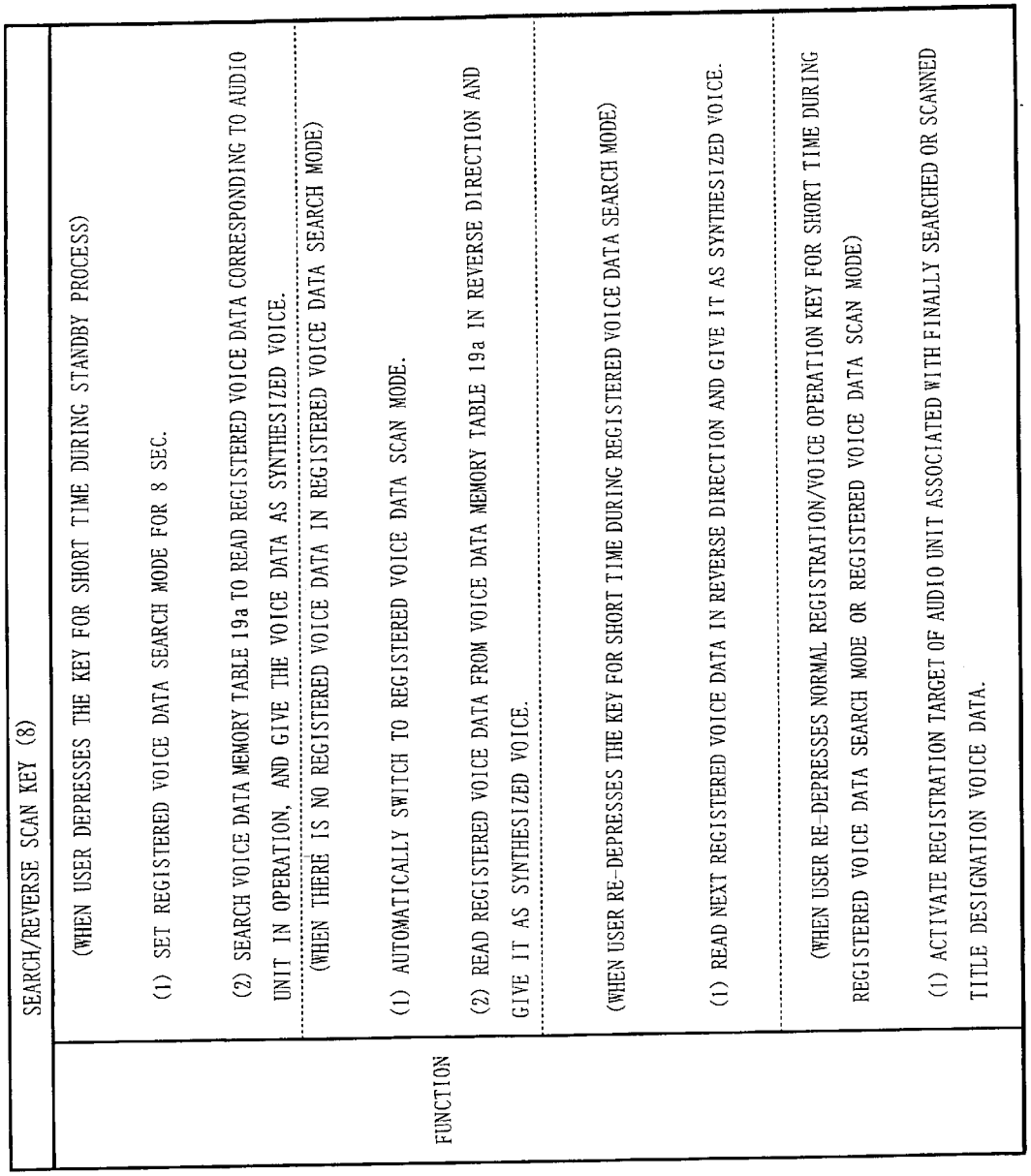
FIGS. 9A and 9B are explanatory diagrams illustrating the functions of a search/reverse scan key.

A description will now be given of the operation in the case where it is determined in step 116 in FIG. 10 that the search/forward scan key 7 or the search/reverse scan key 8 has been continuously depressed for 2 or more seconds. When the depression of this key 7 or 8 continues for 2 or more seconds, the mode is set to the registered voice data scan mode and the processes illustrated in FIG. 8B or FIG. 9B are performed. When the search/forward scan key 7 has been continuously depressed for 2 or more seconds, voice data already registered in the title designation voice data memory table 19a shown in FIG. 3A is read (scanned) in the forward sort direction and is sequentially produced as synthesized voices. If the normal registration/voice-based operation key 6 is depressed during the action, an audio unit corresponding to the last searched or scanned voice data is controlled based on this voice data.

When the search/reverse scan key 8 has been continuously depressed for 2 or more seconds, voice data already registered in the title designation voice data memory table 19a shown in FIG. 3A is read (scanned) in the reverse sort direction and is sequentially produced as synthesized voices. If the normal registration/voice-based operation key 6 is depressed during the action, the currently active audio unit corresponding to the last searched or scanned voice data is controlled based on this voice data.

A description will now be given of the operation in the case where it is determined in step 118 in FIG. 10 that the unit registration/search key 9 has been depressed for a short time. When the short depression of this key 9 occurs, the mode is set to the unit designation voice data search mode and the process shown in FIG. 5B is executed. Specifically, voice data associated with the name of the currently active audio unit, which is already registered in the unit designation voice data memory table 19b, is produced as a synthesized voice. When voice data associated with the name of the currently active audio unit is not registered, the mode is switched to the unit designation voice data scan mode for sequentially producing voice data associated with the names of other audio units as synthesized voices. When the unit registration/search key 9 is depressed again during the unit designation voice data scan mode, the mode is switched to the one that produces the voice data, which is associated with the name of the currently active audio unit and is already registered in the unit designation voice data memory table 19b, as a synthesized voice. When the normal registration/voice-based operation key 6 is depressed during the unit designation voice data search mode or the unit designation voice data scan mode, the currently active audio unit corresponding to the last searched or scanned voice data is controlled based on this voice data.

A description will now be given of the operation in the case where it is determined in step 120 in FIG. 10 that the equalizer-adjustment voice registration/search key 10 has been depressed for a short time. When a short depression of this key 10 occurs, the mode is set to the equalizer-adjustment voice data search mode and the processes shown in FIG. 6C are executed. Specifically, voice data which is associated with the currently set positioning state or the current frequency characteristic of the equalizer and is registered in the equalizer-adjustment voice data memory table 19c shown in FIG. 3C is produced as a synthesized voice. When the equalizer-adjustment voice registration/search key 10 is depressed during the equalizer-adjustment voice data search mode, all the pieces of voice data registered in the equalizer-adjustment voice data memory table 19c is scanned and are sequentially produced as synthesized voices. If the normal registration/voice-based operation key 6 is depressed during the action, the currently active audio unit corresponding to the last searched or scanned voice data is controlled based on this voice data.

To perform a voice-based manipulation, as apparent from the foregoing description, the voice-based manipulation apparatus of this embodiment searches or scans the voice data registered in the title designation voice data memory table 19a, the unit designation voice data memory table 19b and the equalizer-adjustment voice data memory table 19c and produces the searched or scanned voice data as a synthesized voice. Even if the user does not remember registered voice data, the user can easily check the correlation between registered voices and their corresponding manipulation targets. Unlike the prior art, therefore, it is unnecessary to register voice data again from the beginning, thus demonstrating an excellent operability.

As a plurality of operational functions are assigned to each of the operational button switches 6–11, it is possible to reduce the number of required operational button switches, which can contribute to designing the remote operation section 4 more compact.

Although the foregoing description of this invention has been given of the embodiment which is designed to perform voice-based manipulation of an audio system, this invention is not limited to a voice-based manipulation apparatus for audio systems. For example, this invention may be adapted to an on-board unit for a vehicle which has an air-conditioning system equipped in addition to an on-board audio system, so that those audio system and air-conditioning system can be manipulated by voices. Further, this invention is not limited to an audio system, but may be adapted to manipulate various other manipulation targets with voices.

In short, the voice-based manipulation apparatus according to this invention has a search section which searches voice information stored in a storage section in association with a manipulation target and produces the searched voice information. Even if a user has forgotten any registered voice information, for example, this apparatus can provide the user with the correlation between the voice information and the associated manipulation target. This makes it unnecessary for the user to store the voice information again in the storage section due to a memory problem or the like and provides the user an excellent operability.

What is claimed is:

1. A voice-based manipulation apparatus comprising:
   a storage section for storing voice information for specifying manipulation targets in association with said manipulation targets;
   a manipulation section for, when a voice is supplied, manipulating said manipulation targets which are associated with said voice information stored in said storage sections, which corresponds to said voice; and
   a search section for searching said voice information stored in said storage section in association with said manipulation target and presenting resultant voice information.

2. The voice-based manipulation apparatus according to claim 1, wherein in response to a search instruction externally supplied, said search section detects an active manipulation target, searches voice information which is associated with said detected active manipulation target and presents said searched voice information.

3. The voice-based manipulation apparatus according to claim 2, wherein when voice information associated with said active manipulation target is not stored in said storage section, said search section searches other voice information stored in said storage section in association with said manipulation target and presents said searched voice information.

4. The voice-based manipulation apparatus according to claim 2, wherein in response to said search instruction externally supplied, said search section searches said voice information, which is associated with said manipulation target, stored in said storage section in a predetermined order and presents said searched voice information.

5. The voice-based manipulation apparatus according to claim 4, wherein said predetermined order is an alphabetical order.

6. The voice-based manipulation apparatus according to claim 4, wherein said predetermined order is a forward sort direction.

7. The voice-based manipulation apparatus according to claim 4, wherein said predetermined order is a reverse sort direction.

8. The voice-based manipulation apparatus according to any one of claims 1 to 7, wherein said storage section can store said voice information again and stores a supplied voice as voice information associated with an active manipulation target at a time of storing said voice information again.

9. The voice-based manipulation apparatus according to claim 1, further comprising:
   a setting section for setting a search instruction inputted by a user, said search instruction being directed to said search section,
   wherein said search section searches said voice information stored in said storage section in accordance with said search instruction and presents the resultant voice information.

10. The voice-based manipulation apparatus according to claim 9, wherein said setting section sets the search instruction corresponding to time for inputting performed by the user.

11. A voice-based manipulation method comprising the steps of:
   storing voice information for specifying targets in a storage section in association with said manipulation targets;
   manipulating, when a voice is supplied, said manipulation targets which is associated with said voice information stored in said storage section which corresponds to said voice; and
   searching said voice information stored in said storage section in association with said manipulation target and presenting resultant voice information.

12. The voice-based manipulation method according to claim 11, wherein in response to a search instruction externally supplied, said searching step detects an active manipulation target, searches voice information which is associated with said detected active manipulation target and presents said searched voice information.

13. The voice-based manipulation method according to claim 12, wherein when voice information associated with said active manipulation target is not stored in said storage section, said searching step searches other voice information stored in said storage section in association with said manipulation target and presents said searched voice information.

14. The voice-based manipulation method according to claim 12, wherein in response to said search instruction externally supplied, said searching step searches said voice information, which is associated with said manipulation target, stored in said storage section in a predetermined order and presents said searched voice information.

15. The voice-based manipulation method according to claim 14, wherein said predetermined order is an alphabetical order.

16. The voice-based manipulation method according to claim 14, wherein said predetermined order is a forward sort direction.

17. The voice-based manipulation method according to claim 14, wherein said predetermined order is a reverse sort direction.

18. The voice-based manipulation method according to any one of claims 11 to 17, wherein said storage section can store said voice information again and stores a supplied voice as voice information associated with an active manipulation target at a time of storing said voice information again.

19. The voice-based manipulation method according to claim 11, further comprising the step of:

setting a search instruction inputted by a user, said search instruction being directed to said searching step, wherein said searching step searches said voice information stored in said storage section in accordance with said search instruction and presents the resultant voice information.

20. The voice-based manipulation method according to claim 19, wherein said setting step sets the search instruction corresponding to time for inputting performed by the user.

\* \* \* \* \*